United States Patent [19]

Mensch, Jr.

[11] Patent Number: 4,739,475
[45] Date of Patent: Apr. 19, 1988

[54] TOPOGRAPHY FOR SIXTEEN BIT CMOS MICROPROCESSOR WITH EIGHT BIT EMULATION AND ABORT CAPABILITY

[76] Inventor: William D. Mensch, Jr., 1924 E. Hope St., Mesa, Ariz. 85203

[21] Appl. No.: 675,831

[22] Filed: Nov. 28, 1984

Related U.S. Application Data

[63] Continuation-in-part of Ser. No. 534,181, Sep. 20, 1983.

[51] Int. Cl.[4] .......................... G06F 1/00; G06F 9/44; G06F 13/38; H01L 27/00
[52] U.S. Cl. ..................................... 364/200; 307/468
[58] Field of Search ... 364/200 MS File, 900 MS File; 357/41; 307/468, 469

[56] References Cited

U.S. PATENT DOCUMENTS

| | | | |
|---|---|---|---|
| 3,943,377 | 3/1976 | Suzuki | 307/469 |
| 3,987,418 | 10/1976 | Buchanan | 364/200 |
| 4,044,340 | 8/1977 | Itoh | 357/41 |
| 4,144,562 | 3/1979 | Cooper | 364/200 |
| 4,180,861 | 12/1979 | Armstrong et al. | 364/900 |
| 4,213,176 | 7/1980 | Cooper | 364/200 |
| 4,245,324 | 1/1981 | Machol et al. | 307/468 |
| 4,272,828 | 6/1981 | Negi et al. | 364/900 |
| 4,317,171 | 2/1982 | Maejima et al. | 364/200 |
| 4,363,091 | 12/1982 | Pohlman, III et al. | 364/200 |
| 4,402,042 | 8/1983 | Guttag | 364/200 |
| 4,402,043 | 8/1983 | Guttag | 364/200 |
| 4,447,878 | 5/1984 | Kinnie et al. | 364/200 |
| 4,449,184 | 5/1984 | Pohlman, III et al. | 364/200 |
| 4,511,812 | 4/1985 | Satake | 307/465 |
| 4,661,728 | 4/1987 | Kashimura | 307/468 |

OTHER PUBLICATIONS

Cook et al., "Programmable Logic Arrays Using Polysilicon–Gate FETs", IBM Technical Disclosure Bulletin, v 20, No. 4, pp. 1640–1643, 9/77.
Western Design Center, "OXI–CMOS W65SC8XX and W65SC9XX 16–Bit Microprocessor Family".

Primary Examiner—Archie E. Williams, Jr.
Assistant Examiner—Michael J. Ure
Attorney, Agent, or Firm—Cahill, Sutton & Thomas

[57] ABSTRACT

The topography of a sixteen bit CMOS microprocessor chip including circuitry for enabling it to emulate, under software control, a prior art 6502 microprocessor includes an N-channel minterm logic section including 498 "vertical" diffused minterm lines across which 32 "horizontal" metal lines from an instruction register and a timing generator pass and make selective contact to separate polycrystalline silicon gate electrodes to effectuate a first level of instruction op code decoding. The resulting minterm signals are inverted by a row of CMOS inverters, the outputs of which are connected to polycrystalline lines extending into an N-channel sum-of-minterm section. "Horizontal" metal sum-of-minterm conductors contact various N-channel field effect transistors in the sum-of-minterm region. Those sum-of-minterm lines having fewest field effect transistors connected thereto are positioned on the bottom of the sum-of-minterm array, and those having the most connections to N-channel FETs are positioned at the top thereof to minimize the amount of chip surface area required for the sum-of-minterm array and for routing of the sum-of-minterm signals produced thereby to transfer gate logic on the chip.

13 Claims, 16 Drawing Sheets

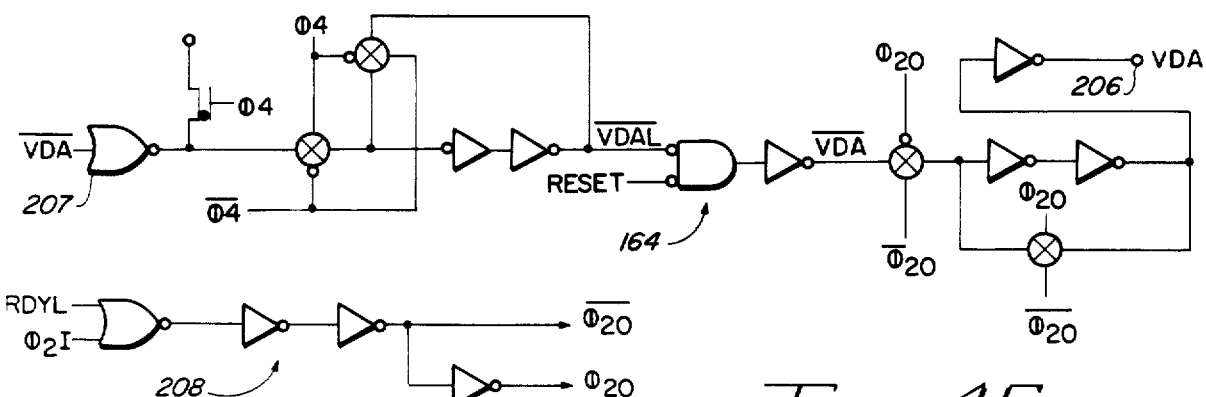

FIG-16

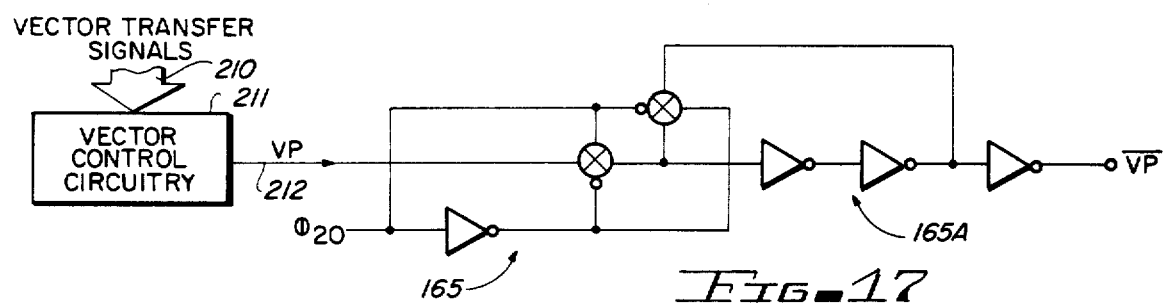

FIG-17

| $\overline{VP}$ | 1 | | 40 | $\overline{RES}$ |
| RDY | 2 | | 39 | VDA |
| $\overline{ABORT}$ | 3 | | 38 | M/X |
| $\overline{IRQ}$ | 4 | | 37 | Φ2(IN) |
| $\overline{ML}$ | 5 | | 36 | BE |
| $\overline{NMI}$ | 6 | | 35 | E |
| VPA | 7 | | 34 | R/$\overline{W}$ |
| $V_{DD}$ | 8 | W65SC816 | 33 | D0/BA0 |
| A0 | 9 | | 32 | D1/BA1 |
| A1 | 10 | | 31 | D2/BA2 |
| A2 | 11 | | 30 | D3/BA3 |
| A3 | 12 | | 29 | D4/BA4 |
| A4 | 13 | | 28 | D5/BA5 |
| A5 | 14 | | 27 | D6/BA6 |
| A6 | 15 | | 26 | D7/BA7 |
| A7 | 16 | | 25 | A15 |
| A8 | 17 | | 24 | A14 |
| A9 | 18 | | 23 | A13 |
| A10 | 19 | | 22 | A12 |
| A11 | 20 | | 21 | $V_{SS}$ |

FIG-20A

| $V_{SS}$ | 1 | | 40 | $\overline{RES}$ |
| RDY | 2 | | 39 | Φ2(OUT) |
| Φ1(OUT) | 3 | | 38 | $\overline{SO}$ |
| $\overline{IRQ}$ | 4 | | 37 | Φ0(IN) |
| NC | 5 | | 36 | NC |
| $\overline{NMI}$ | 6 | | 35 | NC |
| SYNC | 7 | | 34 | R/$\overline{W}$ |
| $V_{DD}$ | 8 | W65SC802 | 33 | D0 |
| A0 | 9 | | 32 | D1 |
| A1 | 10 | | 31 | D2 |
| A2 | 11 | | 30 | D3 |
| A3 | 12 | | 29 | D4 |
| A4 | 13 | | 28 | D5 |
| A5 | 14 | | 27 | D6 |
| A6 | 15 | | 26 | D7 |
| A7 | 16 | | 25 | A15 |
| A8 | 17 | | 24 | A14 |
| A9 | 8 | | 23 | A13 |
| A10 | 9 | | 22 | A12 |
| A11 | 20 | | 21 | $V_{SS}$ |

FIG-20B

TOPOGRAPHY FOR SIXTEEN BIT CMOS MICROPROCESSOR WITH EIGHT BIT EMULATION AND ABORT CAPABILITY

CROSS-REFERENCE TO RELATED APPLICATIONS

This application is a continuation-in-part of my co-pending application "TOPOGRAPHY OF INTEGRATED CIRCUIT CMOS MICROPROCESSOR CHIP", Ser. No. 534,181, filed Sept. 20, 1983, and entirely incorporated herein by reference.

BACKGROUND OF THE INVENTION

The invention relates to an efficient topography for a sixteen bit CMOS microprocessor chip having the capability of either operating as a sixteen bit microprocessor or operating to emulate the well-known 6502 eight bit integrated circuit microprocessor, depending only on the state of a software "emulation bit" or "E" bit.

Those skilled in the art of integrated circuit design, and particularly microprocessor chip design, know that the size of a high volume integrated circuit chip is a dominant factor in the ultimate yield and manufacturing cost per unit. In all of the integrated circuit technologies, including the CMOS technology, large scale integrated (LSI) chips such as microprocessor chips include thousands of conductive lines and P-channel MOSFETS (metal-oxide-semiconductor field effect transistors) and N-channel MOSFETS. Some of the lines are composed of aluminum metal interconnection layers and others are composed of polycrystalline silicon interconnection layers on different insulative layers, and others of the conductors are diffused conductors. Certain minimum line widths and spacings between the respective lines and the sources and drains of the MOSFETS must be maintained to avoid short circuits and parasitic effects despite slight variations in the manufacturing processes due to presence of minute particulates that are invariably present in the semiconductor manufacturing facilities. Due to the low current supplying capability of the very small MOSFETS that must be used in order to achieve high functional density of the integrated circuits, the lengths of the interconnecting lines and their associated capacitances must be minimized, not only to reduce chip size, but also to achieve maximum circuit operating speeds. A wide variety of design trade-offs, including the necessity to minimize chip size, obtain a suitable chip aspect ratio (which enhances integrated circuit chip yield and wire bonding yield), increase circuit operating speeds, reduce power consumption, and achieve acceptable reliability all are involved in obtaining an optimum "layout" or topography of the MOSFETS and the interconnection patterns therebetween are required in order to obtain an integrated circuit which is both economical and has acceptable operating characteristics.

Some of the numerous design constraints faced by the MOSLSI chip designer include specifications for minimum widths and spacings of diffused regions in the silicon, minimum widths and spacings for metal interconnection lines, the minimum size required for polycrystalline silicon conductors, the minimum size required for contact openings in the insulating "field" oxides, the spacings required between the edges of contact openings to the edges of the diffused regions or polycrystalline silicon regions, the fact that polycrystalline silicon conductors cannot cross over each other or over diffused regions in most silicon gate manufacturing processes, and the constraint that conductors on the same layer of insulating oxide cannot cross over like conductors.

Furthermore, the high amount of capacitances associated with diffused regions and the high resistances of both diffused regions and polycrystalline silicon conductors must be carefully considered by the circuit designer and also by the chip designer in arriving at an optimum chip topography. For many types of circuits, such as the microprocessor of the present invention, an extremely large number of conductive lines between sections of logic circuitry are required. The practically infinite number of possibilities for routing the various conductors and placing of the various MOSFETS taxes the skill and ingenuity of even the most resourceful chip designers and circuit designers (and is far beyond the capability of the most sophisticated computer layout programs yet available). Other constraints faced by the chip layout designer and the circuit designer involve the need to minimize cross-coupling and parasitic effects which occur between various conductive lines and conductive regions. Such effects may degrade voltages on various conductors, leading to inoperative circuitry or low reliability operation under certain operating conditions.

The technical and commercial success of an electronic product utilizing MOSLSI technology hinges on the ability of the chip designer to achieve an optimum chip topography. It is well known that a very high level of creative effort is required, usually both by circuit designers or layout draftsmen, to achieve a chip topography or layout which enables the integrated circuit to have acceptable operating speeds and low power dissipation and yet is sufficiently small in chip area to have a high chip per wafer yield, i.e., to be economically feasible. Often, many months of such effort between chip designers and circuit designers result in numerous trial layout designs and redesigns and concomitant circuit design revisions before a reasonably optimum topography for a single MOSLSI chip is achieved. Often, until a particular new overall insight or approach is conceived for a particularly difficult, complex, and large functional subsection of an integrated circuit chip, such as an instruction decoding subsection in a microprocessor, is arrived at, the desired chip is clearly economically unfeasible. It is on the basis of such an insight that the eight bit CMOS chip topography described in the above-mentioned parent application became economically feasible, resulting in a CMOS that has become a commercial success. It is on the basis of another such insight, arrived at after over a year of design and layout experimentation, that the sixteen bit CMOS microprocessor layout of the present invention could be reduced to a size that made the chip size commercially practical and resulted in adequate operating speed.

Although various single chip microprocessors, such as the 6502, the 6800, the 68000, the 8088, the Z80, and others have been widely used, all of them have various shortcomings from the viewpoint of a computer system designer trying to design a low cost computer system because of the inconvenience of implementing certain functions. Some of the functions that are difficult to implement using prior single chip microprocessors include the problems of efficiently using program memory, i.e., typically slow ROM (read-only memory), in which the program is stored and data memory, i.e., high speed memory in which intermediate data results are stored, dealing with abort conditions such as invalid addresses, which requires aborting the present instruction, executing an abort subroutine, and then re-executing an entire subroutine in which the aborted instruction was contained.

Another problem that is faced by computer designers using prior single chip microprocessors is the need to have new software written for computers that use newly developed, faster microprocessors with greater computing power. It would be very desirable to provide a technique by means of which newer microprocessors, such as 16 or 32 bit microprocessors, can execute already available software written for previous single chip microprocessors having fewer bits in their data words, fewer instructions, and generally less computing capability.

SUMMARY OF THE INVENTION

Accordingly, it is an object of the invention to provide an economical topography for a CMOS sixteen bit microprocessor chip.

It is another object of the invention to provide an economical topography for the layout of a sixteen bit CMOS microprocessor chip capable, under software control, of either emulating the prior well-known 6502 eight bit microprocessor or operating as a sixteen bit microprocessor having advanced abort operation and other advanced capabilities.

It is another object of the invention to provide an improved sixteen bit CMOS microprocessor chip that incorporates various new features which provide a system designer increased flexibility in dealing with memories of different speeds, in dealing with interrupts of various priorities, and in recovering from an abort condition.

Briefly described, and in accordance with one embodiment thereof, the invention provides an efficient topography for an integrated circuit sixteeen bit CMOS microprocessor chip including emulation logic circuitry for enabling the microprocessor, under software control, to emulate a pre-existing eight bit microprocessor or to operate as a sixteen bit processor with advanced operating capabilities, the chip including a surface with left, bottom, right, and top edges, the chip including on its surface a data bus, an address bus, low order address buffers located along the left lower side, high order address buffers located along the bottom edge, data bus buffers located on the lower right edge, a relatively large register section including low order address latches, arithmetic logic unit circuitry, stack registers, program incrementers and latches, high order address latches, status register circuitry, data output latches, and data input latches positioned in the foregoing sequence from the left side to the right side of the chip, and located generally above the high order address buffers, and between the low order address buffers and the data bus buffers the chip also including instruction register circuitry and predecode circuitry located along the right edge of the chip above the data bus buffers, timing control circuitry located along the left edge above the low order address buffers, N-channel minterm read-only memory decoding circuitry including minterms that result from a first level of decoding of op codes for sixteen bit microprocessor operation, minterm inverter drivers disposed beneath the N-channel minterm read-only memory decoding ciruitry, and N-channel "sum-of-minterm" read-only memory decoding circuitry disposed between the minterm inverter drivers and the register section. In the described embodiment of the invention, the N-channel minterm read-only memory decoding circuitry includes a plurality of "vertical" diffused lines, a plurality of polycrystalline silicon gate conductors defining the minterms being decoded, and a plurality of "horizontal" metal conductors connected to outputs of the instruction register and responsive to certain bits, including an emulation bit of the status register, which horizontal metal conductors make contact to predetermined ones of the polycrystalline silicon gates. The emulation bit of the status register is coupled to emulation output logic circuitry located in the upper right-hand corner of the chip and is also connected to auxilliary index register circuitry and stack register circuitry in the register section. Specialized circuitry located along the top edge of the chip from left to right includes non-maskable interrupt logic, memory lock logic, maskable interrupt logic, abort logic, ready logic, vector pull logic, reset interrupt logic, valid data address logic, status register logic, clock oscillator circuitry, and data bus enable circuitry adjacent to the upper boundary of the N-channel minterm circuitry. Valid program address logic is located above the low order address buffers along the left edge of the chip. A conductor from the abort logic is connected to the auxilliary index registers, stack registers, accumulator circuitry and status register circuitry, i.e., to all registers that the programmer has access to, to inhibit transfers of data from any of those registers during an abort operation.

In the N-channel sum-of-minterm read-only memory decoding circuitry, a plurality of vertical diffused lines are connected to a ground conductor and have various short horizontal extensions thereof at locations where field effect transistors (FETs) are required in the sum-of-minterm decoding circuitry. A plurality of vertical polycrystalline silicon conductors are connected to the outputs of the respective minterm inverter drivers and run parallel to and the respective vertical vertical diffused lines, intersecting the various horizontal extensions thereof to define the N-channel FETs. Sum-of-minterm outputs are produced on a plurality of horizontal metal conductors extending through the sum-of-minterm read-only memory decoding circuitry and making electrical contacts to various ones of the diffused drain regions of the various N-channel FETs. The horizontal metal lines to which the drains of only a few of the sum-of-minterm FETs are connected are positioned at the bottom of the sum-of-minterm read-only memory decoding circuitry, and diffused or polycrystalline silicon conductors from register transfer logic of the register section are connected to appropriate ones of those lower horizontal metal conductors. Those horizontal metal conductors having the largest numbers of sum-of-minterm field effect transistors connected thereto are located near the top of the sum-of-minterm read-only memory decoding circuitry, and are routed around the right end of that circuitry, downward, and are extended by means of diffused or polycrystalline silicon conductors as needed to conduct the sum-of-minterm signals to appropriate portions of the register transfer logic. Horizontal metal conductors having intermediate numbers of FETs connected thereto are located generally in the middle of the sum-of-minterm read-only memory decoding circuitry, and are arranged to allow diffused or polycrystalline silicon conductors to extend downward into the register transfer section.

In accordance with another embodiment of the invention, the invention provides a microprocessor chip which contains an emulation bit that causes the microprocessor chip to emulate a different microprocessor that internally operates on data words having fewer bits by using the emulation bit to "extend" op codes of the different microprocessor to generate register transfer signals that effectuate operation in an "emulation" mode or a "native" mode. In the described embodiment of the invention, the sixteen bit microprocessor emulates a pre-existing eight bit microprocessor if the emulation bit is a "one". If the emulation bit is a "one", this forces two other bits to be logical "ones". The additional bits cause certain indexing operations to be eight bit operations, and cause operations on the stack registers to be sixteen bit operations, and modifies operations on certain status register bits. The emulation bit and the two additional bits also are used in conjunction with decoding the eight bit op codes. Abort logic circuitry is provided which responds to an external signal indicating an abort condition and prevents modification of data in all registers accessible by the programmer, including the program counter latches, the index registers, the stack registers, the accumulator registers, the status register, and several other registers. After the abort circuitry has been reset, execution of the instruction during which the abort condition occurred can be repeated using the information in the registers at the time the abort condition occurred. Circuitry is provided for generating valid program address and valid data address signals which facilitate convenient accessing and operation of relatively fast data memory and relatively slow program memory. Vector pull circuitry is provided to generate an external signal that indicates when an interrupt vector is being generated, facilitating, in some cases, simple interrupt prioritizing.

BRIEF DESCRIPTION OF THE DRAWINGS

FIG. 5 is a scale negative image of a photomask used to pattern the interconnect metal during manufacture of the sixteen bit CMOS microprocessor chip of the present invention, with major sections shown in FIG. 1 being blocked out in heavy lines.

FIG. 6 is a scale negative image of a photomask used to define diffusion regions during the manufacture of the sixteen bit CMOS microprocessor chip of the present invention.

FIG. 7 is a scale negative image of a photomask defining regions in which N-channel MOSFETS can be produced on the microprocessor chip of the present invention.

FIG. 8 is a scale positive image of a photomask used in defining the polycrystalline silicon layer of the CMOS microprocessor chip of the present invention.

FIG. 9 is a scale positive image of a photomask used in defining the N-type diffused regions in the CMOS microprocessor chip.

FIG. 10 is a scale positive image of a photomask used in defining the P-type diffused regions in the CMOS microprocessor chip.

FIG. 11 is a scale positive image of a photomask defining all metal-to-diffusion, metal-to-polycrystalline silicon, and polycrystalline silicon-to-diffusion contacts in the microprocessor chip.

FIG. 12 is a scale negative image of the photomask used in defining the metalization pattern of the sixteen bit CMOS microprocessor chip.

FIG. 16 is a logic diagram of the valid data address (VDA) circuitry indicated in FIGS. 1 and 4.

FIG. 17 is a logic diagram of the vector pull (VP) circuitry indicated in FIGS. 1 and 4.

FIGS. 20A and 20B are diagrams illustrating the pin connections for packages in which the microprocessor chip of FIG. 1 can be encapsulated to provide a sixteen bit microprocessor capable of emulating a 6502 microprocessor and a pin compatible replacement for prior 6502 microprocessor and having advanced operating capability, respectively.

DESCRIPTION OF THE INVENTION

Figure 1:
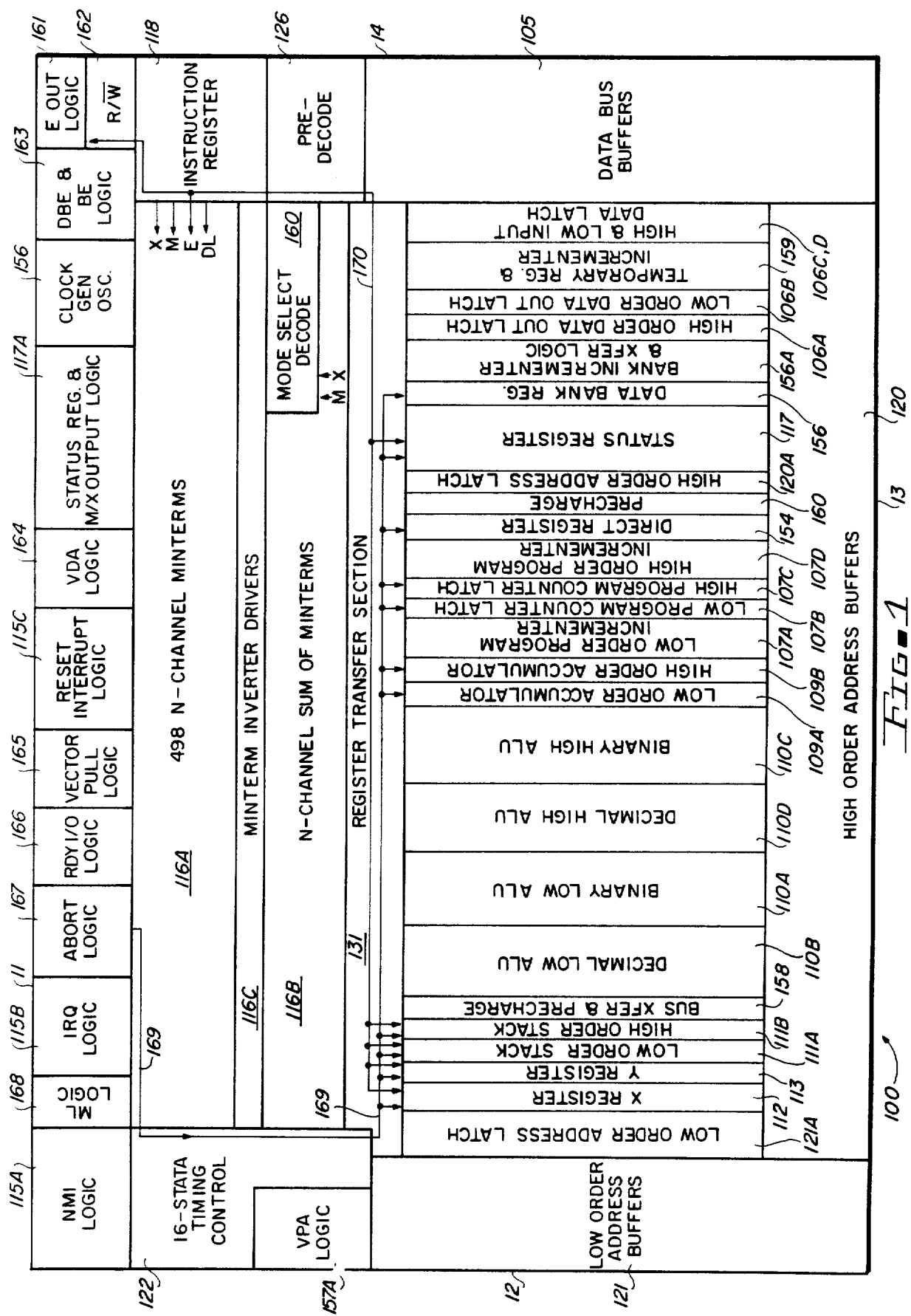
FIG. 1 is a block diagram illustrating the general location of major circuit sections on the sixteen CMOS microprocessor chip of the present invention.

Before describing the chip topographical layout, the architecture and general operation will first be described with reference to FIG. 4. Microprocessor 100 outputs sixteen addresses, A0–A15. The address outputs are generally designated by reference numeral 101. Address bus lines A0–A7 are connected to low order address buffers 121. Address lines A8–A15 are stored in high order address buffers 120. A bus enable conductor 150 connected to data bus/bank address buffer circuit 151 is also connected to and enables address buffers 120 and 121. Both low order address buffer 121 and high order address buffer 120 are loaded by means of internal address bus 103. The address output buffers 120 and 121 are set to a high impedance output state in response to the bus enable (BE) signal 151.

Microprocessor 100 includes eight bidirectional data bus conductors D0–D7, generally designated by reference numeral 119. These eight conductors also can be used to output a eight bit "bank address" representing a third address byte. Accordingly, the signals and conductors designated by reference numeral 119 are also individually designated by DB/BA0–DB/BA7.

φ2 is the main system clock, and since 24 address bits are always available for chip 100, address bits A0–A15 and bank address bits BA0–BA7 are output during the portion of the φ2 time period during which φ2 is low. When φ2 is high, data read/write operations can be performed on the output conductors 119.

A data bus enable (DBE) conductor 145 and a bus enable (BE) conductor 150 are connected between data bus and bank address buffer circuits 105 and buffer control circuitry 152. External data bus enable signals DBE and bus enable signal BE are applied to inputs to buffer control circuit 152, which are gated to conductors 145 and 150 in response to control signals on conductor 153 and external inputs BE or DBE.

The bus enable (BE) signal 150 allows external "three-stating" control of the data bus buffers 105 and the address buffers 120 and 121. For normal operation, the BE signal is high, causing the address buffers 120 and 121 to be "active" and also causing the data bus buffers 105 to be "active" during a write cycle. When external control of the address lines 101 is desired, the BE signal is held low to disable the address output buffers 120, 121. The data bus enable (DBE) signal allows external control of the three-state data output buffers contained in block 105. To disable the data bus externally, the DBE signal should be held low.

The function of internal address bus 103 is simply to effectuate transfer of data from the internal registers to the address buffers 120 and 121. Internal bus address bus 103 is internally bidirectionally coupled to sixteen bit stack pointer register 111, sixteen bit arithmetic logic unit circuitry 110, sixteen bit program counter circuitry 108, and sixteen bit direct register 154. Sixteen bit index register 112 can be loaded onto internal address bus 103, as can sixteen bit data latch 106.

Data bus buffer circuitry 105 receives all of the basic information for the microprocessor 100 in the form of op codes, addresses and operands, one byte at a time. Data bus buffer 105 then supplies such information to the appropriate bytes of data latch 106, from which that information can be transferred to the appropriate bytes of internal address bus 103, internal data bus 141, pre-decode circuitry 126, or to instruction register 118. pre-decode circuit 126 is actually a subsection of instruction register 118, and generates control signals that are applied to register transfer logic circuitry 131 and timing control circuitry 122 in response to the present instruction.

Program counter 16 actually includes four different groups of circuitry, including a low order program counter latch, a high order program counter latch, a low order program incrementer, and a high order program incrementer. The two program latches store the address of the present instruction until it is over, even during execution of an abort instruction. The generalized function of the program counter 108 is to provide sequential addresses for the program being executed.

Accumulator circuitry 109 includes a high order byte and a low order byte and contains the results of all data operations performed by the arithmetic logic unit circuitry 110.

Internal special bus 114 is a sixteen conductor bus which can be coupled by means of transfer switches 142 to sixteen bit internal data bus 141 in response to appropriate decoding transfer signals from register transfer logic 131. Internal special bus 114 is bidirectionally coupled to index register 113, index register 112, stack pointer register 111, arithmetic logic unit circuitry 110 and accumulator circuitry 109, all of which are sixteen bit circuits. Internal data bus 141 is bidirectionally coupled to sixteen bit accumulators 109, sixteen bit program counter 108, eight bit direct register 154, eight bit program bank register 155, eight bit data bank register 156, and eight bit data latch 106.

Arithmetic logic unit 110 includes four subsections, including a low order binary ALU, a low order decimal ALU, a high order binary ALU, and a high order decimal ALU. Arithmetic logic unit 110 performs all the basic logic operations such as addition, substraction, multiplication, exclusive ORing logical ANDing, logical ORing, bit testing, etc., and can also compute addresses, which is why it has connections to both the internal address bus 103 and the internal bus 114 and the internal data bus 141.

Stack pointer register 111 keeps track of stack locations in memory and points to them. The two index registers 112 and 113 enable a software program to simultaneously point to two different software tables.

Reference numeral 117 designates a nine bit register referred to as the status register. It contains individual operating status flags for indicating the status of microprocessor 100. These flags include a negative (N) bit, an overflow (V) bit, a memory select (M) bit, an index register select (X) bit, a decimal mode (D) bit, an interrupt disable (I) bit, a zero (Z) bit, a carry (C) bit, and an emulation (E) bit. As subsequently explained in more detail, if the (E) bit is a "one", the microprocessor 100 emulates the well-known 6502 eight bit microprocessor. If the (E) bit is a "zero", the microprocessor 100 is said to be in its "native" mode and does not emulate the 6502. If the (E) bit is a "one", the microprocessor forces the (X) and (M) bits to also be "ones". If the (X) bit is a "one", it in effect masks off the upper byte of the X index register 112, allowing only eight-bit indexing operations, which are the type performed by the 6502 microprocessor, but which can also be performed by a sixteen bit microprocessor that might need to perform an eight bit indexing operation. If the (X) bit is a "zero", this causes index register 112 to perform a sixteen bit indexing operation. The M bit has the effect of "extending" the eight bit op codes in the instruction register. If the (M) bit is a "one", this has the effect of causing eight bit operations on the accumulator and on memory. If the M bit is a "zero" this has the effect of causing the same operations, i.e., sixteen bit operations, on all sixteen bits of the accumulator and causes all operations on external memories to be sixteen bit operations.

The microprocessor chip contains a simple "power up" circuit that, in addition to forcing certain other initial states in the microprocessor when it is initially powered on, sets the (E) bit at a "one". All microprocessors and most dynamic MOS logic circuits have such "power up" circuitry, which can be readily provided by those skilled in the art and therefore is not described in further detail. If E is a "zero", the microprocessor operates in the state determined by the X and M bits.

The basic timing for microprocessor 100 is contained by clock generator circuit 156. The addresses are output during the φ2 period when φ2 is low, or during φ2 "low time", or φ2L. (φ2 is shown in Appendix A.) During φ2 "high time" (φ2H) data is transferred on the external data bus conductors 119. φ4 is utilized to establish internal timing waveform edges which minimize the amount of internal logic circuitry associated with addressing certain random access memories requiring a row address strobe (RAS) signal and a column address strobe (CAS) signal. The OSC*(OUT) signal is applied to a crystal whose other terminal is connected to the input of the inverter havings its input connected to the $\phi 0(IN)-2(IN/CLK)$ conductor to provide enough gain to create oscillation using the external crystal. The $\phi 1/(OUT)$ signal is the inverted $\phi 2(OUT)$ signal to provide timing for external R/W* operations.

Note that an asterik (*) is used herein to denote the "zero" or "false" state of a logic variable, since the conventional "bar" is unavailable on the printer being used by applicant.

In block 122, timing control or timing generator circuitry produces sixteen timing states that are respectively stepped through in sequence. This circuitry is reset each time a new instruction is begun and is incremented in accordance with the number of cycles, from one to sixteen required for execution of that instruction. The outputs of timing control circuit 122 are connected to inputs of the instruction decode circuitry, and more specifically to the minterm decoding circuitry 116A of the instruction decode circuitry. These outputs, in conjunction with output signals from instruction register 118, are operated upon by the instruction decoder minterm circuitry 116A to generate intermediate signals needed to produce register transfer signals such as 131-1 to 131-11, which are produced by the register transfer logic circuitry 131. The register transfer logic simply latches the intermediate signals (subsequently described as sum-of-minterm signals or register transfer signals) and then clocks the latched register transfer signals onto conductors 131-1, etc., at the appropriate times to effectuate the desired information transfers The read/write* (R/W*) signal is normally in the high state, indicating that microprocessor 100 is reading data from memory or from an input/output bus. In the low state of the read/write* (R/W*) signal, the data bus has valid data to be output from the microprocessor to the address memory location specified by address lines A0–A5 and DB/BA0–DB/BA7 lines. The R/W* conductor can be set to a high impedance output state by the bus enable signal (BE) on conductor 150.

The system control circuitry 157 receives signals from the register transfer logic circuitry 131 and the E bit of the status register 117, and produces outputs on the R/W* conductor, the VPA (valid program address) the VDA (valid data address), the memory lock (ML)* signal, the vector pull (VP)* conductor, the emulate (E) conductor, and the M/X conductor. The system control circuitry in block 157 includes the subsequently described circuits shown in FIGS. 13–19.

The status register 117 is bidirectionally coupled to the register transfer logic 131.

An internal sync signal produced bY timing control circuit 122 is provided to identify cycles of instruction execution during microprocessor operation. If the ready (RDY) line is pulled to a low state level during the $\phi 2$ low times, microprocessor 100 will stop in its current state and will remain in that state until the RDY line goes high, whereby the sync signal can be used to control the RDY signal so that it causes single instruction execution.

The memory lock (ML)* signal output by timing control circuit 122 indicates the need to defer the rearbitration of the next bus cycle to ensure the integrity of read-modify-write instructions. The (ML)* signal goes low during the ASL, DEC, INC, LSR, ROL, ROR, TRB, and TSB memory referencing instructions, which are well-known to those in the art familiar with programming of the 6502 microprocessor.

Interrupt logic circuitry contained in block 115 has outputs bidirectionally connected to the request transfer logic 131. The interrupt request (IRQ) signal requests an interrupt signal to be executed by microprocessor 100. If the interrupt flag in the status register 117 is a "zero", the current instruction is completed and the interrupt sequence begins during $\phi 2$ low time. The program counter and status register contents are stored in a "stack" in external memory. The microprocessor will then set the interrupt mask flag high so that no further interrupts may occur. At the end of the cycle, the low order program counter register 108 will be loaded from the hexadecimal address OOFFFE in the emulation mode and OOFFEE in the native mode, and the program counter will be located from the hexadecimal location OOFFFF in the emulation mode, and OOFFEF in the native mode, thereby transferring program control to the memory vector located at these addresses. The RDY signal must be in the high state for any interrupt to be recognized.

The non-maskable interrupt (NMI)* input of interrupt logic 115 makes interrupt requests in response to a negative-going edge to the effect that a non-maskable interrupt sequence is to be generated within microprocessor 100. The current instruction is completed and the interrupt sequence begins during the following $\phi 2$ low time. The program counter is loaded with the interrupt vector from the locations OOFFFA for the emulation mode and OOFFEA for the native mode for the low order byte and the locations OOFFFB for the emulation mode and OOFFEB for the native mode for the high order byte, thereby transferring program control to the non-maskable interrupt routine.

The reset (RES)* input to interrupt logic 115 causes an initialization sequence to begin by means of a positive transition from a (RES)* input signal. The reset signal must be held low for at least two clock cycles after the power supply voltage $V_{DD}$ reaches its operating voltage from a powered down condition, after which time R/W* is high and sync is low. When a positive edge is detected on the (RES)* line, an initialization sequence lasting six clock cycles occurs. The interrupt mask flag is set, the decimal mode bit of the status register 117 is cleared, the program counter 108 is loaded with the reset vector from the locations OOFFFC for the low order byte and OOFFFD for the high order byte which is the start location for program control.

The decoding of the present instruction by means of the minterm instruction decoding circuitry 116A and sum-of-minterm section 116B produces signals which drive the register transfer logic circuitry 131. The output signals thereof 131-1 to 131-11 are coupled to transfer gates of the various registers in the "register section" of FIGS. 1 and 4 and generate the necessary enable signals to effectuate transfer of data between the various busses and various registers and the arithmetic logic unit 110. All control for transferring data between the various registers, the arithmetic logic unit, and the various busses is accomplished by these and other such transfer signals produced by decoding of the instruction op codes.

The first level instruction decoding in minterm circuitry 116A generates 498 minterm signals, as opposed to 252 for the 6502 microprocessor described in the above-referenced parent application. The second level of decoding in block 116B produces 132 "sum-of-minterm" signals which are used to set or reset clocked latches contained in the register transfer logic circuitry 131. At appropriate times the states of these clocked latches are output in response to appropriate clock signals to produce the register transfer signals to actually effectuate the various data transfers between the registers, arithmetic logic unit, and internal busses, required for execution of the present instruction.

Four entirely new signals are included in the sixteen bit microprocessor, when operating in its "native" mode, i.e., with the emulate (E) bit equal to "zero". These include an (ABORT)* input which can interrupt the currently executing instruction without modifying internal registers. The valid data address (VDA) and valid program address (VPA) outputs facilitate dual cache memory by indicating whether a data segment (fast memory) or program segment (slow memory) is accessed. Modifying or prioritizing a vector is made easy by monitoring the vector pull (VP)* output.

Figure 14:
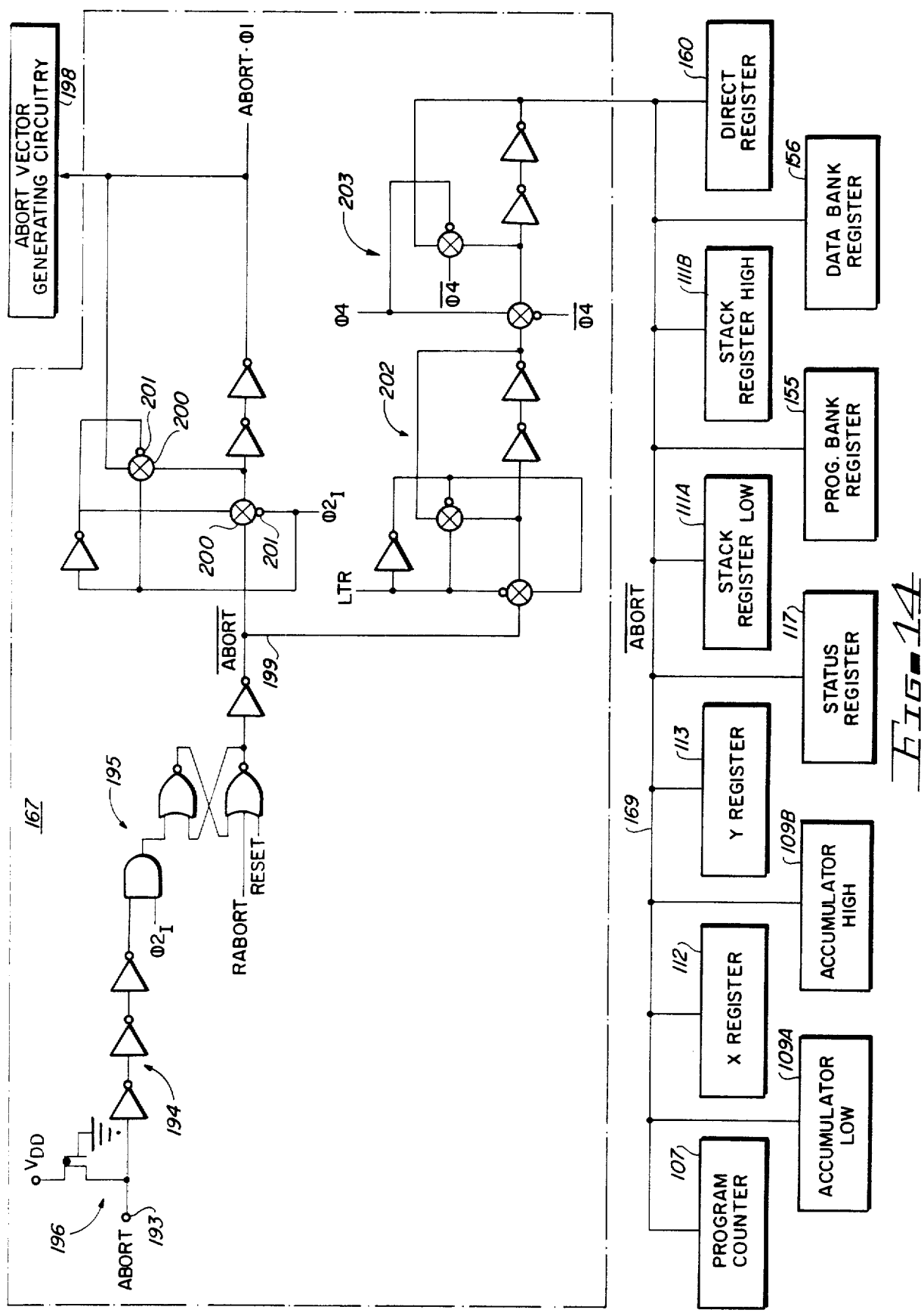
FIG. 14 is a logic diagram illustrating the abort circuitry generally indicated in FIGS. 1 and 4.

The ABORT input is used to abort other instructions presently being executed as a result of an error condition, such as an incorrect address appearing on the address bus. FIG. 14, subsequently described, discloses the specific abort circuitry. A negative-going edge of the ABORT input "aborts" the present instruction from the cycle during which the abort signal is pulled to a low level. This prevents any and all internal registers accessible by the programmer from being modified. At the end of the present instruction, an "interrupt-like" operation pushes the program counter, program status register and bank register (in the native mode only) onto the external memory stack, sets the interrupt status register flag to a "one" sets the decimal flag to "zero", sets the program bank register to "zero", and loads the program counter with the contents of address locations 00FFF8 and 00FFF9 for the emulation mode and OOFFE8 and OOFFE9 in the native mode. The ABORT signal cannot be masked, and specifically prevents internal transfers into or out of the data bank registers, the program bank register, the status register, the direct register, the accumulator registers, the stack registers, and the X and Y index registers until the abort logic is reset. However, the abort input does not affect any incrementers or the arithmetic logic unit circuitry. In order to implement the desired operation of the abort logic, none of the foregoing registers are ever updated until after an instruction is completed. Therefore, if the negative-going edge of the ABORT input occurs during the execution of a particular instruction, and if the execution of that instruction is not complete, the contents of the foregoing registers remain intact, since any transfers are inhibited by the abort circuitry. The interrupt-like operation causes the microprocessor 100 to go in a conventional manner to a vector address of an abort subroutine. After the abort subroutine has been completed, the microprocessor can return and readily re-execute the same instruction that was being executed when the abort occurred because none of the internal registers have changed.

Figure 15:
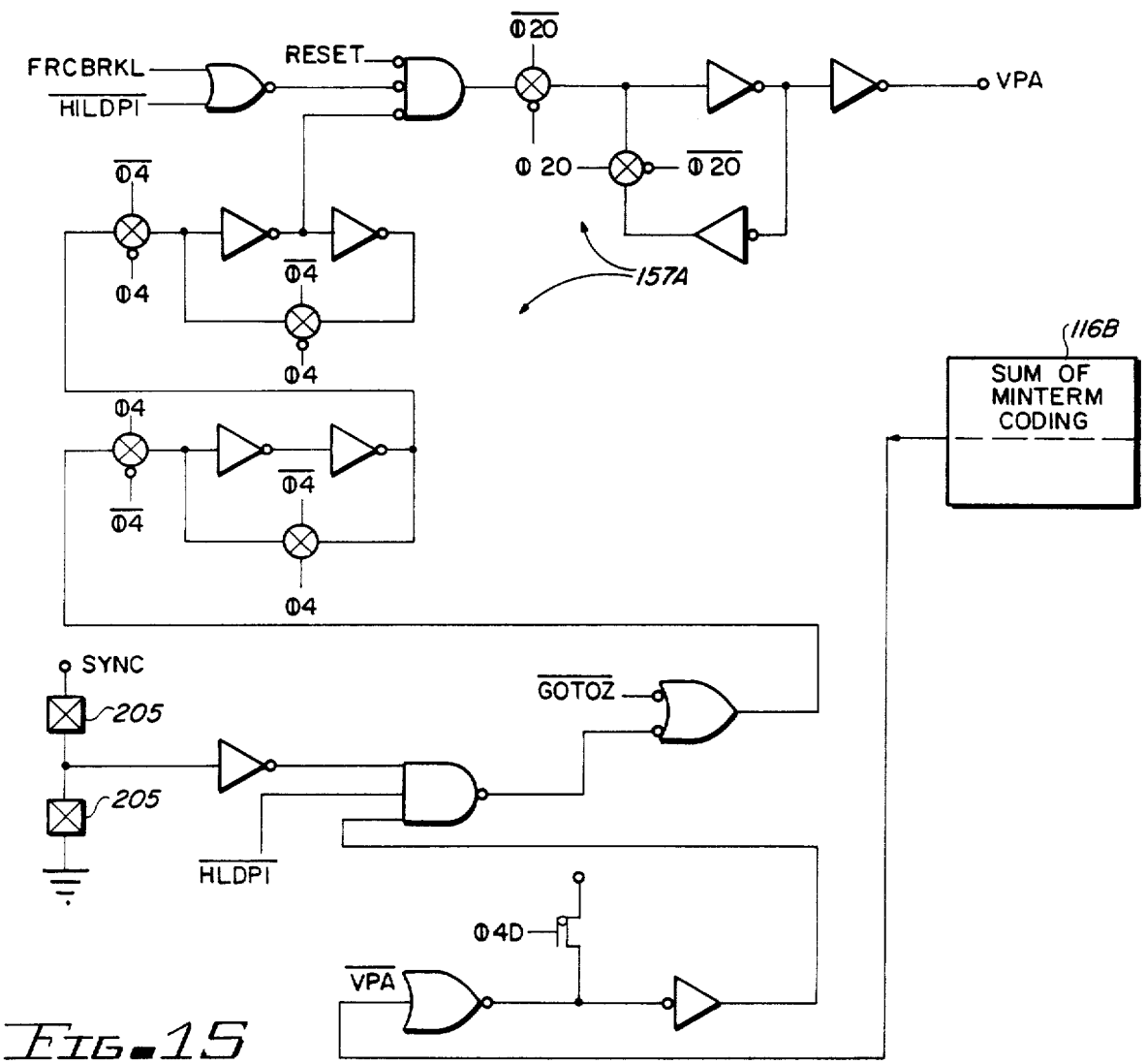
FIG. 15 is a logic diagram illustrating the valid program address (VPA) circuitry of FIGS. 1 and 4.

The vector pull (VP)* output goes low during the two cycles when a vector address is being pulled, for example in response to an (IRQ)* active input. The vector pull output goes low for all interrupt vector pulls, and for the (ABORT)*, BRK, COP, (IRQ)*, (NMI)*, and (RES)* signals. The vector pull output thus may be used to modify and/or prioritize interrupt routines. The vector pull logic is shown in FIG. 15.

The valid data address (VDA) and valid program address (VPA) outputs indicates the type of memory being addressed by the address bus. If both VDA and VPA are "zeros", the present microprocessor operation is entirely "internal" and the address and data busses are both available. If VDA is "zero" and VPA is a "one", a valid "program" address is on the address bus 101. (Program addresses are usually for a relatively slow memory, such as read-only memory or floppy discs.) This signals other circuitry, such as a memory controller that the clock signal can be operated at a slow rate. If VDA is a "one" and VPA is a "zero", this indicates to an external memory controller that there is a valid data address on the bus, and rapid access may be desired. If both VDA and VPA are "ones", an operational code (op code) fetch operation is occurring. The VDA and VPA outputs may be used for virtual and cache memory control.

A complete preliminary information data sheet for the microprocessor of the present invention, designated the W65SC816, is attached hereto as Appendix A, and describes more completely certain capabilities and the instruction set of the microprocessor chip.

Figure 4:
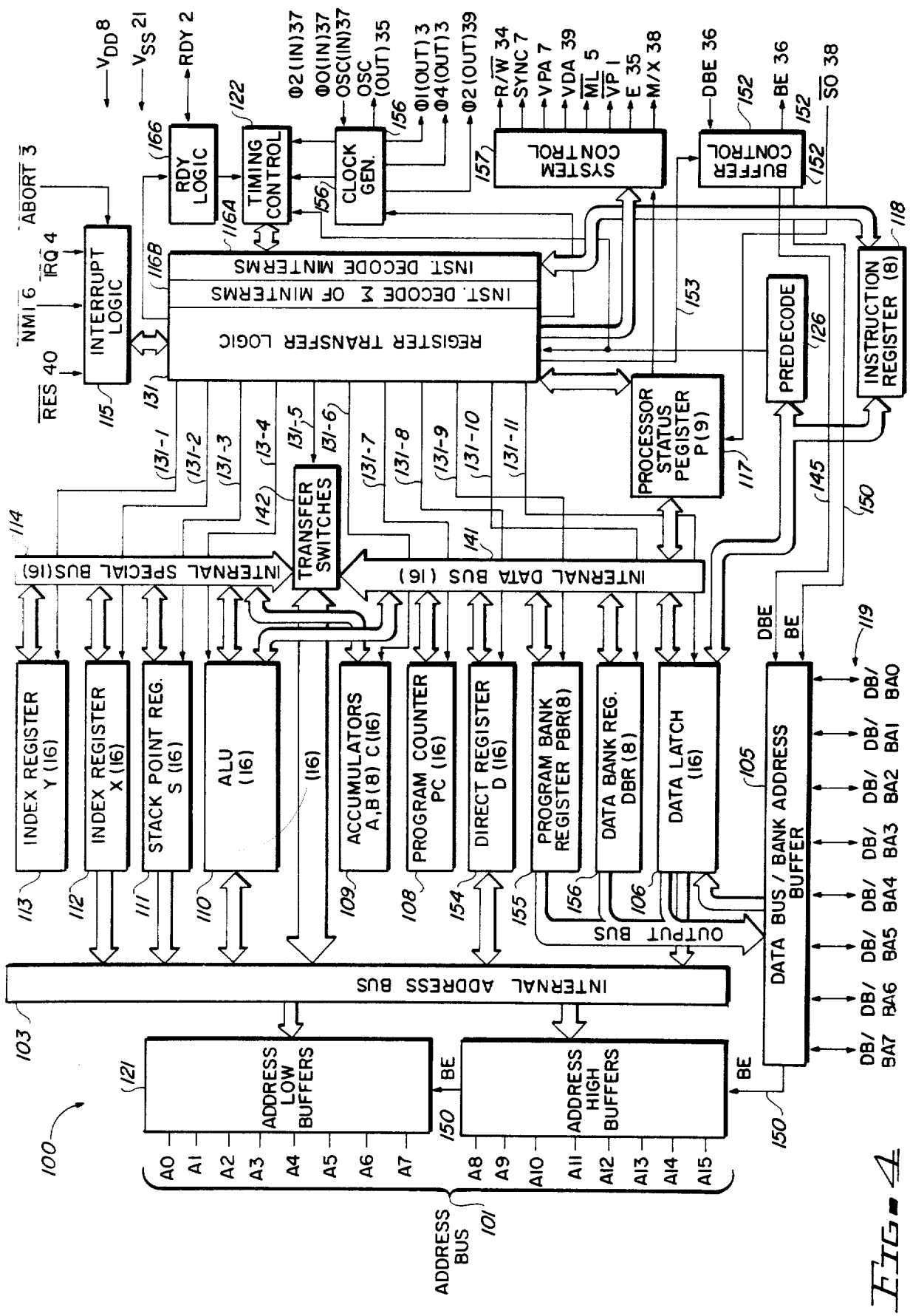
FIG. 4 is a block diagram illustrating the architecture of the microprocessor chip.

Those skilled in the art can obtain various designs for the various latching, arithmetic, and other logic circuits shown in FIG. 4. All of these types of circuits have been implemented in N-channel MOS in the widely used 6502 microprocessor; CMOS versions can be implemented in various ways by those skilled in the art, and a complete circuit schematic of the chip 100 is not needed to enable one skilled in the art to produce the invention.

Referring now to FIG. 1, the topography of microprocessor chip 100 will be described, indicating the locations of the various major blocks of circuitry on the chip. Chip 100 includes a flat surface with a top edge 11, a left edge 12, a bottom edge 13, and a right edge 14. The vertical dimension of chip 100 is 278 mils, and its horizontal dimension is 164 mils. (Note that the same reference numerals, with subscripts if appropriate, are used in FIG. 1 to indicate the same or corresponding blocks of circuitry in FIGS. 1 and 4.) The low order address buffer circuitry 121 is 2052 microns in the vertical direction and 716 microns in the horizontal direction, and is positioned along the lower left-hand portion of edge 12 and the lower right-hand portion of edge 13. (There are 25.4 microns per mil.) High order address buffers 120 are 566 microns in the vertical direction and 5436 microns in the horizontal direction, and lie along bottom edge 13 of microprocessor chip 100. Data bus buffers 105 are 2030 microns in the vertical direction and 906 microns in the horizontal direction, and extend from bottom edge 13 upward along right edge 14. The "register section" of microprocessor 100 is surrounded on three sides by low order address buffers 121, high order address buffers 120, and data bus buffers 105. The register section is 5436 microns in the horizontal direction and 1136 microns in the vertical direction and includes the following blocks of circuitry, the dimensions of which are given below in Table 1. The vertical dimension of each of the blocks in the register section is 1136 microns.

TABLE 1

| NAME | WIDTH IN MICRONS |
|---|---|
| Low order address latch 121A | 296 |
| X register 112 | 120 |

TABLE 1-continued

| NAME | WIDTH IN MICRONS |
|---|---|
| Y register 113 | 120 |
| Low order stack register 111A | 110 |
| High order stack register 111B | 126 |
| Bus transfer and precharge circuitry 158 | 138 |
| Low order binary ALU 110A | 486 |
| Low order decimal ALU 110B | 446 |
| High order binary ALU 110C | 538 |
| High order decimal ALU 110D | 446 |
| Low order accumulator 109A | 138 |
| High order accumulator 109B | 120 |
| Low order program incrementer 107A | 236 |
| Low order program counter latch 107B | 61 |
| High order program counter latch 107C | 61 |
| High order program incrementer 107D | 232 |
| Direct register 154 | 176 |
| Precharge circuitry 160 | 88 |
| High order address latch 120A | 72 |
| Status register 117 | 488 |
| Program bank register 155 | 88 |
| Data bank register 156 and Input bank incrementer and transfer logic 156A | 196 |
| High order output data latch 106A | 114 |
| Low order output data latch 106B | 110 |
| Temporary register and incrementer 159 | 256 |
| High order input data latch 106C and low order input data latch 106D | 174 |

As is known to those skilled in the art, precharge circuitry such as that included in blocks 158 and 160 is required in all dynamic MOS circuitry to set initial values of certain conductors in response to certain precharge signals. For example, such precharge circuitry is used to preset the data bus conductors and address bus conductor lines to initial values at the beginnings of various operation cycles and to set certain bits in certain registers and latches to specified "one" or "zero" initial levels.

Non-maskable interrupt (NMI) logic circuitry, which is 530 microns by 628 microns, is located in the upper left corner of chip 100. (Hereinafter, when dimensions of blocks of circuitry are given, the horizontal dimension will be given first and then the vertical dimension.) Memory lock logic 168 (560 by 628 microns) is located immediately to the right of NMI logic 115A. IRQ logic 115B (444 microns by 628 microns), abort logic 167 (480 microns by 628 microns), ready I/O logic 166 (426 microns by 628 microns), vector pull logic 165 (356 microns by 628 microns), reset interrupt logic 115C (714 microns by 628 microns), VDA logic 164 (460 microns by 628 microns), status register and M/X output logic 117A (546 microns by 628 microns), clock generator oscillator circuitry 156 (896 microns by 628 microns), and DBE and BE logic circuitry 163 (538 microns by 628 microns) are positioned from left to right along the top edge 11 of chip 100. Emulate bit output is located in the extreme upper right-hand corner of chip 100, and R/W* is located immediately below emulation bit output logic 161. Instruction register 118 (840 microns wide) is located immediately below R/W* logic 162, and predecode circuit 126 (525 microns by 525 microns) is located between instruction register 118 and data bus buffer circuitry 105. Sixteen state timing control circuitry 122 is located along the left edge 12 of chip 100, as indicated in FIG. 1, occupying 780 microns by 744 microns, VDA logic 157A (340 microns by 570 microns) is located in the lower left corner of block 122.

It should be noted that many (41) bonding pads which are located around the periphery of microprocessor chip 100 are not shown in FIG. 1. These bonding pads are included in the various blocks or areas, such as data bus buffers 105, higher address buffers 120, data bus buffers 105, etc. to effectuate wire bonding of the input and output conductors of chip 100 to leads of a package such as the one in FIG. 20A. FIGS. 20A and 20B include diagrams of two pin configurations, one for the sixteen bit operational version of the microprocessor 100, and the other for the circuit when it is set up to be pin compatible with the prior 6502 microprocessor. Immediately above the register section is a N-channel sum-of-minterms section 116B, which is approximately 752 microns in the vertical direction. Mode select decode circuitry 160 (866 microns by 210 microns), occupies the upper left-hand corner of block 116B, however.

Above the sum-of-minterm section 116B is a block 116C (198 microns in the vertical direction), containing 498 CMOS inverters, which invert 498 N-channel minterms contained in block 116A, which is 346 microns in the vertical direction.

A conductor 169 from abort logic 167 is routed around blocks 116A, 116B and 116C, and is connected to inhibit data transfers in the X and Y index registers 112 and 113, the high and low order stack registers 111A and 111B, the high and low order accumulaters 109A and 109B, the direct register 154, the status register 117, the program bank register 155, the low order program counter latch 107B, the high order program counter latch 107C, and the data bank register 156. An emulate conductor 170 connected to the E bit in status register 117 is connected to force the higher byte to be a "zero" in each of the X and Y index registers 112 and 113, and forces a hex 01 in the high order stack register 111B, and is also routed to the E output logic block 161 to produce an output signal indicative of whether the microprocessor 100 is emulating a 6502 microprocessor or is operating in its "native" sixteen bit mode.

The scale images of the photomasks shown in FIGS. 6-11, 12A, and 12B are included as being of interest in that they show the density of circuitry and other features of interest to microprocessor chip designers. It would be possible to determine the precise layout of the microprocessor chip of the present invention from the information contained in the photomasks, although one skilled in the art ordinarily would not resort to this expedient because it would be more practical to follow the teachings made with reference to the other figures herein and, in accordance with the various permissible line spacings and line widths for a particular CMOS manufacturing process, use various available CMOS latch circuits, inverters, and arithmetic circuits that he prefers. The teachings herein with reference to the instruction decoding circuitry, in sections 116A, 116B, and 116C, would have to be followed in order to obtain the benefits of the invention.

The main sections or blocks indicated in FIG. 1 are superimposed in heavy lines on the scale negative image metalization pattern of FIG. 5.

In accordance with the present invention, the improvement of the layout of the instruction decode portion of the chip, including minterm read-only memory decoding circuitry 116A, minterm inverter drivers 116C, and sum-of-minterm read-only decoding circuitry 116B made it possible to reduce the width of the instruction decode section of the chip 100 by approximately 30% over what would have been required if only the techniques used in the layout of the instruction decode section of the above-referenced parent application were used. The layout techniques of the present invention also reduced the "vertical" dimension of the instruction decode region, including all of the necessary wire routing of register transfer signals to the register section of approximately 40%.

If I had not been able to achieve this reduction in the instruction decode circuitry of the chip, its width would have been roughly 65 mils greater and its heighth would have been about 16 mils greater.

FIG. 3C of the parent application illustrates the basic layout of N-channel minterm circuitry 116A and sum-of-minterm circuitry 116B of the microprocessor chip 100. FIG. 3B of the present application more accurately represents the layout structure of N-channel minterm circuitry 116A of the present application, wherein the diffused minterm lines 175, and hence all the N-channel MOSFETs formed therein, are each nine microns wide and are spaced apart by two microns. The horizontal polycrystalline silicon lines 176 are 5 microns wide. Metal jumpers such as 177 are utilized between aligned portions of the diffused lines 175 where no N-channel FET gate is desired. Thus, the average center-to-center spacing in the horizontal direction between successive vertical diffused minterm lines is eleven microns. The nine micron width of the gate regions such as 178 is conventional for dynamic N-channel MOS NAND gates in this type of circuit, and is necessary to provide adequate output node discharge times in a read-only memory array such as 116A. When I designed this circuit for the microprocessor in the above-referenced parent application, I believed, after performing a computerized circuit analysis, that the MOS gates 178 had to be at least nine microns wide.

Even so, the instruction decoding in the microprocessor of the parent application was not as fast as desired. One reason for this is that I encountered a difficult design trade-off involving the capacitance of the horizontal polycrystalline silicon conductors 176 from the instruction register and the accumulated capacitance of the various MOS gates such as 178 in the N-channel minterm circuitry 116A. Making the MOSFET gates even wider decreased the minterm signal propagation time in the vertical direction, but increased the horizontal signal propagation along the polycrystalline silicon lines 176 by increasing the capacitance and the resistance of the polycrystalline silicon lines 176, and hence increasing their RC time constant.

At that time, I believed that in order to design a sixteen bit CMOS microprocessor which would be suitable as a "follow-up" product to the CMOS microprocessor of the parent application, many more diffused minterm lines would be required, and it appeared to me that the minterm circuitry 116A therefore would be much wider and slower than desired. But I did not see any solution to this problem.

Returning to the present invention, the basic layout in minterm circuitry 116A will be described and then, after also describing the layout in the sum-of-minterm circuitry 116B of FIG. 2, the combined decoding operation of the two sections will be explained, indicating the resulting improvement in operating speed and savings in chip area.

Figure 3A:
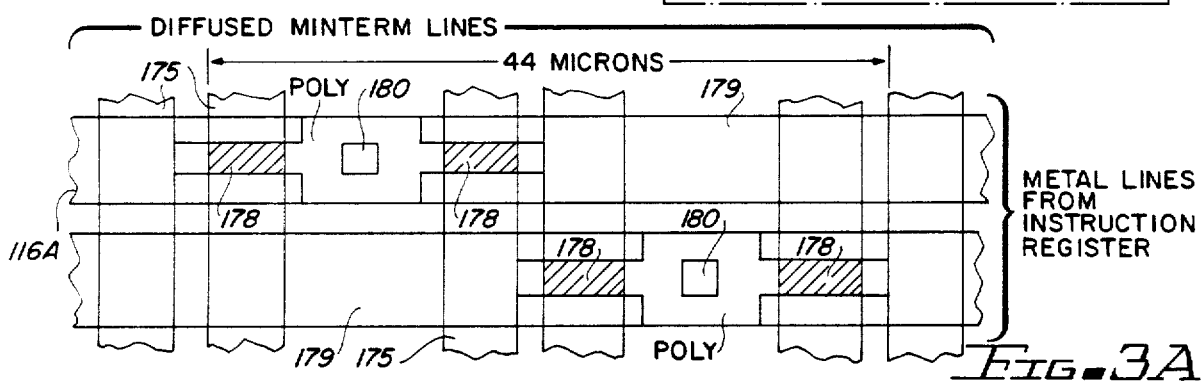
FIG. 3A is a partial layout illustrating the connection of diffused minterm lines, polycrystalline silicon gate conductors, and metal control lines in the minterm decoding region of the microprocessor chip.
Figure 3B:
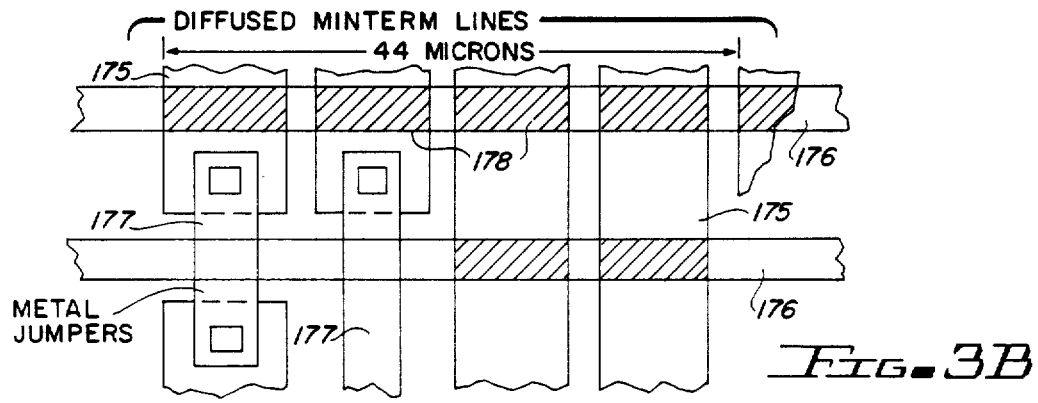
FIG. 3B is a diagram illustrating a partial layout of the technique for layout of diffused lines, N-channel gate electrodes and metal jumpers in the microprocessor layout described in the above-referenced parent application.

In FIG. 3A, reference numerals 175, with appropriate letters, are used to designate the diffused minterm lines. Each of the diffused lines 175 is only five microns wide, rather than nine microns as in FIG. 3B. This almost doubles the channel resistance of the N-channel MOS-FETS formed, slowing down signal propagation downward through the minterm region 116A. Reference numeral 179 designates horizontal metal lines (rather than the horizontal polycrystalline silicon lines 176 in FIG. 3B) which are connected to the outputs of the instruction register. These metal lines have far lower resistance than the polycrystalline silicon lines, so the RC time constant of lines 179 is much less than that of the polycrystalline silicon conductors 176 of FIG. 3B. The polycrystalline silicon gates required for each of the N-channel MOS transistors such as 178 in FIG. 3A make electrical contact to the metal lines 179 by means of contacts openings 180. Since the accumulated gate capacitance associated with each of the metal lines 179 has been nearly halved, the output drive current needed from the instruction register latches is nearly halved. This, coupled with the greatly reduced time constant associated with each of the lines greatly increases the signal propagation time along the metal lines 179.

Figure 2:
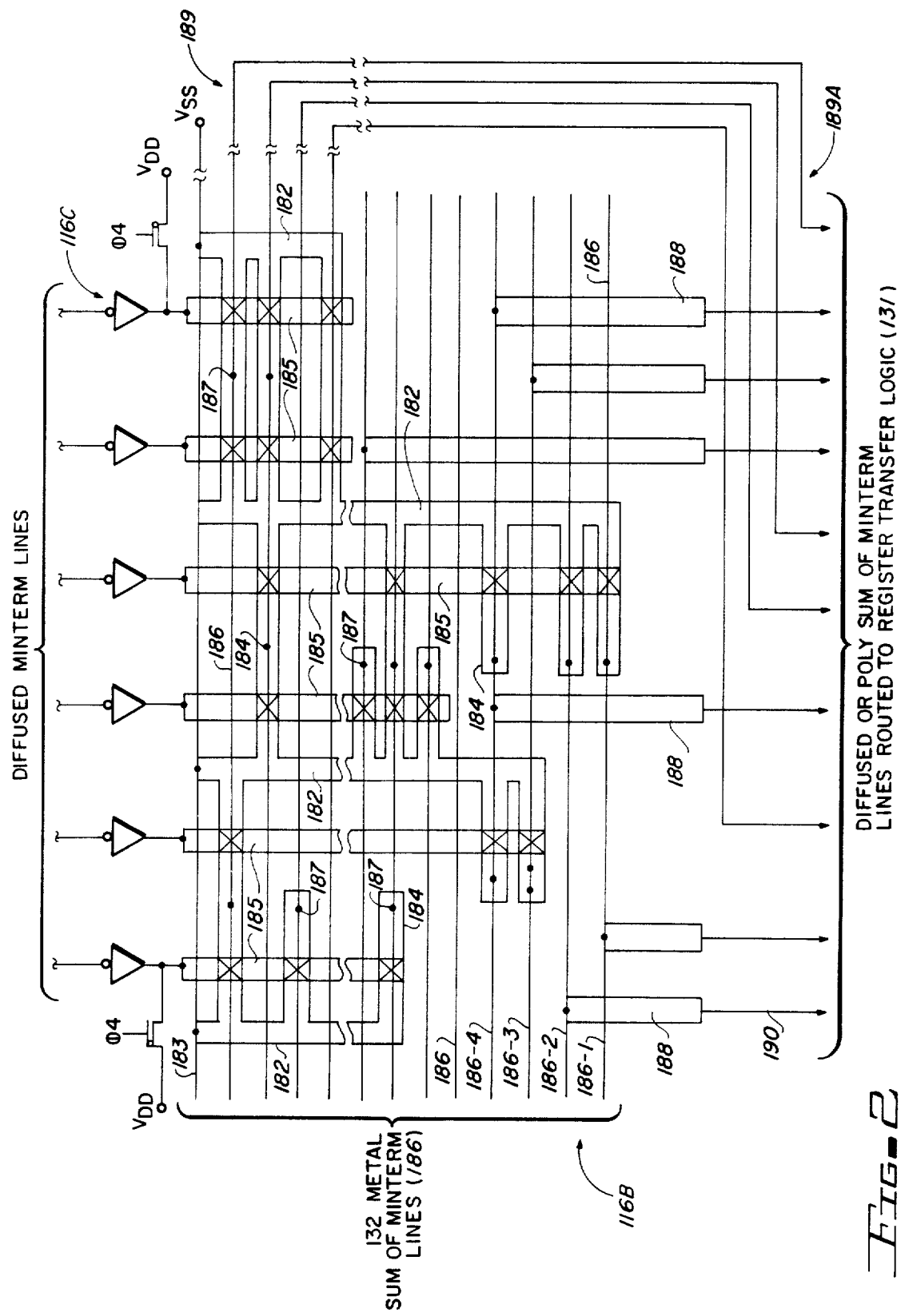
FIG. 2 is a schematic circuit diagram illustrating the technique for interconnection of diffused, polycrystalline silicon, and metal conductors in the sum-of-minterm decoding region of the microprocessor chip of the invention.

Referring next to FIG. 2, reference numeral 116C discloses a plurality of CMOS minterm inverter drivers, each having its input connected to the bottom of a respective one of the minterm lines 175. Inverter drivers 116C, although they have a relatively high gate capacitance that further slows signal propagation downward through the N-channel minterm region 116A, are capable of driving the capacitance associated with the polycrystalline silicon conductors 181, 181A, 181B, etc., more effectively than the minterm lines and minterm MOSFETs 178 of FIG. 3B could if the inverter drivers 116C were to be omitted. Furthermore, the signal inversion produced by the inverter drivers 116C makes it possible to obtain logical NORing in sum-of-minterm circuitry 116B using N-channel, rather than P-channel MOSFETs that were used in section 116B of FIG. 3C of the parent application. (Such N-channel MOSFETs have only about one-half of the channel resistance of P-channel MOSFETs of the same geometries, making it possible for there to be considerably faster downward signal propagation of the inverted minterm signals through sum-of-minterm region 116B than previously.)

In FIG. 2, reference numerals 182, with appropriate suffix letters such as A, B, etc., designate diffused regions that are attached to a $V_{SS}$ conductor 183 and extend vertically downward through circuitry 116B. The vertical diffused regions 182 have horizontal extensions such as 184 wherever an N-channel sum-of-minterm decoding MOSFET is required. The gate electrodes of such N-channel sum-of-minterm MOSFETs are indicated by X's wherever such horizontal extensions 184 are crossed by vertical inverted minterm polycrystalline silicon conductors such as 185.

The drain electrodes of each of the sum-of-minterm MOSFETs are connected to horizontal metal conductors such as 186 by means of contact openings such as 187, thereby performing the minterm summing operation.

Each of the vertical polycrystalline silicon conductors 185 is connected to the output of a respective one of the minterm inverter drivers 116C.

The general approach of providing vertical diffused lines 182, horizontal diffused extensions 184, vertical polycrystalline silicon conductors 185, horizontal metal conductors 186, and contacts 187 is basically the same as FIG. 3C of the parent application. However, using this technique (as I did on the chip of the parent application) on the chip 100 of the present invention would have resulted in a much wider sum-of-minterm region 116B than I actually achieved because of the much higher number of sum-of-minterm transfer signals that are required for the sixteen bit microprocessor chip of the present invention. Furthermore, I was able to arrive at a reasonably optimum layout of the sum-of-minterm region in the parent application only after three very laborious trial layouts in which I followed the approach described in the above-referenced parent application to positioning the minterm summing horizontal metal lines 186 in such a way as to provide gaps through which diffused and/or polycrystalline silicon conductors could be "dropped" down into the register transfer logic where the resulting sum-of-minterm transfer signals were needed, to avoid utilization of an excessive amount of chip surface area for routing such signals.

However, the method of arranging the relative positions of the horizontal metal sum-of-minterm lines 186 is different than in the above-referenced parent application. (Of course, the relative placement of the horizontal metal lines 186 determines the placement of all N-channel MOSFETs connected to a particular horizontal line, and hence determines how far down into sum-of-minterm region 116B the vertical poly (polycrystalline silicon) lines 185 and the vertical diffused lines 182 extend.)

In view of the fact that the number of minterms (498) is nearly double that in the above-referenced parent application, and in view of the great amount of time that was required by me to use the approach described in the parent application to arrange the positions of the horizontal metal lines so as to create "gaps" between diffused regions adequate for routing diffused or polycrystalline silicon register transfer signal lines more or less directly downward to the location in the register transfer section in which those lines were needed, I decided, after much reflection, to take an entirely differently, almost opposite approach to that in the present application, partly just to get at least part of the layout done and in the hope that at that point a better solution would occur to me. I therefore brought the vertical diffused lines 182 and the adjacent vertical polycrystalline silicon lines 185 which were to be included in those sum-of-minterm signals comprised of the fewest number of minterms, for example, only one or two minterms, all the way down to the lowest horizontal metal lines 186.

For example, in FIG. 2, assume that horizontal metal conductors 186-1, 186-2, 186-3 and 186-4 are the sum-of-minterm conductors having the fewest N-channel MOSFETs (denoted by X's), i.e., minterms, connected thereto. More specifically, sum-of-minterm conductors 186-1, 186-2 and 186-3 each have only one or two minterms. Only one minterm actually is shown for each of these lines in FIG. 2, but assume that another located to the left or right of the section shown in FIG. 2 might also be connected. Sum-of-minterm metal conductor 186-4 has two minterms connected thereto, and possibly another to the right or left to the section shown in FIG. 2. I continued this pattern, working my way from the bottom horizontal sum-of-minterm conductor up, and each time I connected all the minterms, (only a few) to the next highest horizontal sum-of-minterm conductor 186, I also brought downward a vertical diffused or polycrystalline silicon conductor such as 188 downward, using "cross-unders" of a different type where necessary, to the register transfer gates. The point at which each of the vertical lines 188 was connected to the various sum-of-minterm horizontal metal sum-of-minterm lines 186 was located as directly as possible above the point in the register section at which that transfer signal, i.e., the sum-of-minterm transfer signal, was needed. By the time I had done this operation all of the sum-of-minterm lines comprising less than about approximately four or five minterms, nearly 30% of the sum-of-minterm gate transfer signals had been routed to their proper destination, leaving only 77 to go, all of which, of course, included more than five or six minterms, and which would be much more difficult to route than the first group.

I then decided that the most difficult-to-route sum-of-minterm signals, i.e., those comprising the largest numbers of minterms, should be located at the top of the sum-of-minterm array, and that these metal lines should be generally routed around the right-hand side of the sum-of-minterm array, as indicated by reference numeral 189 in FIG. 2, and brought back to the right, as indicated by reference numeral 189A, to locations directly above where the particular sum-of-minterm transfer signals would be needed in the register section of the chip 100, using cross-unders as necessary. I thus began working my way from the top sum-of-minterm metal conductors 186 downward for the sum-of-minterm lines having large numbers of minterms, i.e., N-channel MOSFETs, connected thereto. It was my hope that by positioning the horizontal metal sum-of-minterm conductors containing the fewest numbers of minterms at the bottom and those containing the greatest numbers of minterms at the top of the sum-of-minterm array, there would be enough gaps, i.e., regions with adequate spacing between diffused regions, in the intermediate region to allow fairly direct downward routing of diffused and/or polycrystalline silicon conductors from the sum-of-minterm conductors containing intermediate numbers of minterms, located more or less directly above where those intermediate sum-of-minterm transfer signals were required in the register section.

As this approach to layout of the sum-of-minterm region 116B progressed, my foregoing hunch turned out to be correct, and with much less effort than I thought might have been required, I was able to complete the layout of the sum-of-minterm region with much less expenditure of time, and with only approximately 40% less chip area than I thought would have been required if I had not hit upon this approach.

Note that in FIG. 2, reference arrows 190 simply designate continuations of the diffused or polycrystalline silicon sum-of-minterm transfer lines 188 more or less directly downward into the register transfer section.

Figure 2A:
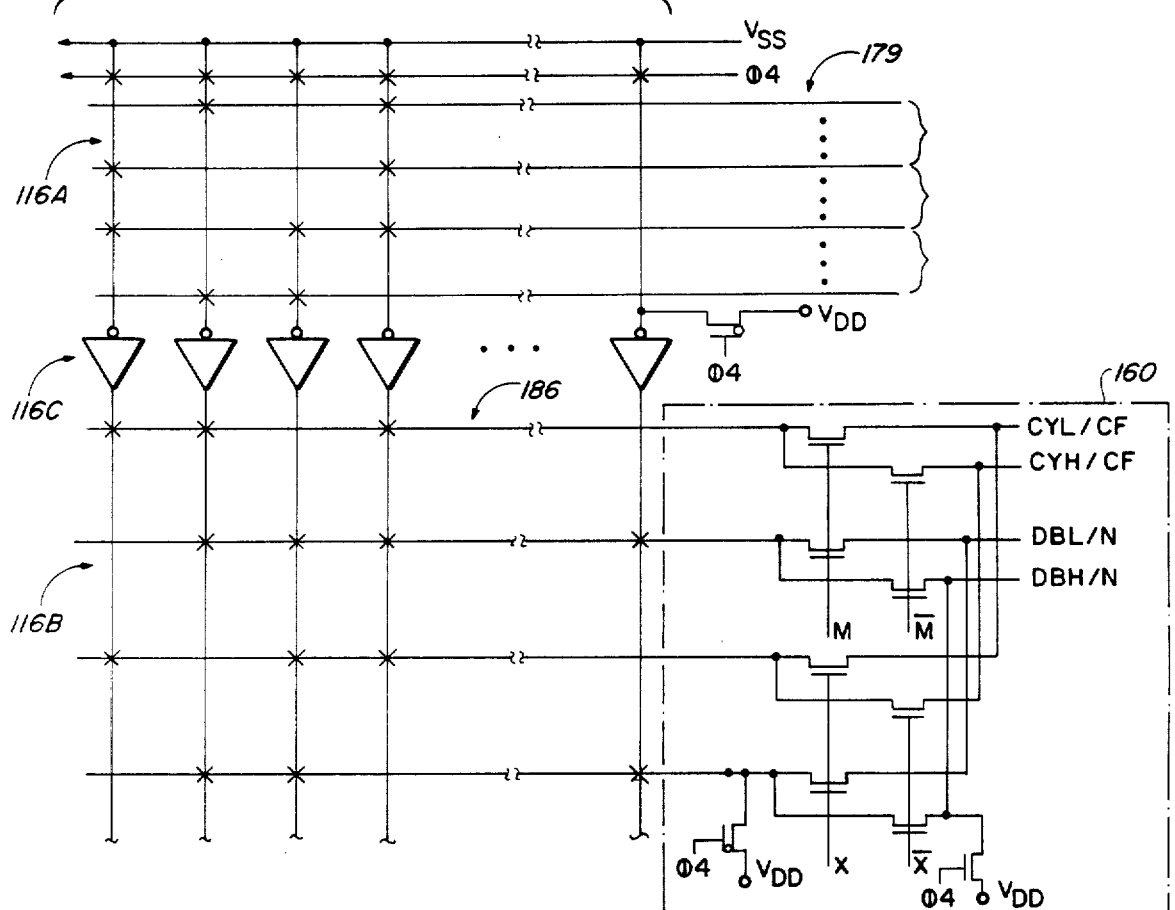
FIG. 2A is a diagram illustrating the circuitry in the minterm, minterm inverter driver, and sum-of-minterm and mode select decoding portions of the microprocessor chip.

FIG. 2A schematically discloses the structure of both the minterm region 116A and the sum-of-minterm region 116B and also the minterm inverter drivers 116C described above with reference to FIGS. 2 and 3A, and further discloses the mode select decode circuitry 160, in which the M and X bits of the status register 117 are included in the decoding function performed by the sum-of-minterm decoding section 116B in order to produce the transfer signals CYL/CF (low order carry bit to carry flag), CYH/CF (high order carry bit to carry flag), DBIL/N (data bus low bit 7 to the N flag), DBIH/N (data bus high bit 7 to the N flag), and also the transfer signals "output latch low" to DBO and "output latch high to DBO", and also "special bus low to accumulator A" and "special bus high to accumulator B", and "zero detect of the low byte to the Z flag" and "zero detect low and high to the Z flag", "reset zero bit of the timing generator", and "set timing generator bit 1".

Table 2 contains a list of all of the sum-of-minterm transfer signals for chip 100 and their functional descriptions in abbreviated language that one skilled in the art familiar with the instruction set in Appendix A and the diagram of FIG. 4 will readily understand.

TABLE 2

| Sum-of-Minterm Number | Symbol | Description |
|---|---|---|
| 1. | A/DBL | Transfer A accumulator to data bus low |
| 2. | A/SBL | Transfer A accumulator to special bus low |
| 3. | AB/AL | Transfer address bus to address latch |
| 4. | AB/PI | Transfer address bus to program incrementer |
| 5. | ABH/AXH | Transfer address bus high to ALU X input high |
| 6. | ABL/AXL | Transfer address bus low to ALU X input low |
| 7. | ADD | Add decimal |
| 8. | AL/AB | Transfer address latch to address bus |
| 9. | AUH/ABH | Transfer ALU high to address bus high |
| 10. | AUH/DBH | Transfer ALU high to data bus high |
| 11. | AUH/SBH | Transfer ALU high to special bus high |
| 12. | AUL/ABL | Transfer ALU low to address bus low |
| 13. | AUL/DBL | Transfer ALU low to data bus low |
| 14. | AUL/SBL | Transfer ALU low to special bus low |
| 15. | B/DBH | Transfer B accumulator to data bus high |
| 16. | B/SBH | Transfer B accumulator to special bus high |
| 17. | BRKCOPV | Execute BRK or COP instruction |
| 18. | BRKE | Executing BRK in emulation mode |
| 19. | BRNCHE | Executing branch instruction in emulation mode |
| 20. | CF/A7H | Transfer carry flag to ALU high bit 7 |
| 21. | CF/A7L | Transfer carry flag to ALU low bit 7 |
| 22. | CF/CIL | Transfer carry flag to ALU low carry in |
| 23. | CLRV | Clear V flag |
| 24. | COPV | Force COP vector |
| 25. | CYH-BKI | Transfer ALU carry high compliment to bank incrementor input |
| 26. | CYH/BKI | Transfer ALU carry high to bank incrementor input |
| 27. | CYH/CF | Transfer ALU carry high to carry flag |
| 28. | CYL/CF | Transfer ALU carry low to carry flag |
| 29. | D/DB | Transfer direct register to data bus |
| 30. | DB/D | Transfer data bus to direct register |
| 31. | DB/PI | Transfer data bus to program incrementor |
| 32. | DB/SB | Transfer data bus to special bus |
| 33. | DBH-/AXH | Transfer data bus high compliment to ALU X input high |
| 34. | DBH/AXH | Transfer data bus high to ALU X input high |
| 35. | DBH/N | Transfer data bus high bit 7 to N flag |
| 36. | DBH/NEG | Transfer data bus high bit 7 to NEG latch |
| 37. | DBH/OLH | Transfer data bus high to output latch high |
| 38. | DBH/V | Transfer data bus high bit 6 to V flag |
| 39. | DBI/ILH | Transfer input data bus to input latch high |
| 40. | DBI/ILL | Transfer input data bus to input latch low |
| 41. | DBI/T | Transfer input data bus to temporary register |
| 42. | DBL-AXL | Transfer data bus low compliment to ALU X input low |
| 43. | DBL/AXL | Transfer data bus low to ALU X input low |
| 44. | DBL/CF | Transfer data bus low bit 0 to carry flag |
| 45. | DBL/DBH | Transfer data bus low to data bus high |
| 46. | DBL/DBR | Transfer data bus low to data bank register |
| 47. | DBL/N | Transfer data bus low bit 7 to N flag |
| 48. | DBL/NEG | Transfer data bus low bit 7 to NEG latch |
| 49. | DBL/OLL | Transfer data bus low to output latch low |
| 50. | DBL/P | Transfer data bus low to status register |
| 51. | DBL/PBR | Transfer data bus low to program bank register |
| 52. | DBL/V | Transfer data bus low bit 6 to V flag |
| 53. | DBR/DBL | Transfer data bank register to data bus low |
| 54. | DBR/DBO | Transfer data bank register to output data bus |
| 55. | DCE | Decimal carry enable |
| 56. | DH/ABH | Transfer direct register high to address bus high |
| 57. | DL/ABL | Transfer direct register low to address bus low |
| 58. | EOR | Execute EOR operation in ALU |
| 59. | GOTO6 | Force timing generator to state 6 |
| 60. | GOTO7 | Force timing generator to state 7 |
| 61. | GOTOZ | Force timing generator to state 0 |
| 62. | HLDOLD | Hold previous address in address latches |
| 63. | ILH/ABH | Transfer input latch high to address bus high |
| 64. | ILH/DBH | Transfer input latch high to data bus high |
| 65. | ILL/ABL | Transfer input latch low to address bus low |
| 66. | ILL/DBL | Transfer input latch low to data bus low |
| 67. | IR5 | Instruction register bit 5 |
| 68. | IR5/CF | Transfer instruction register bit 5 to carry flag |
| 69. | IR5/D | Transfer instruction register bit 5 to decimal flag |
| 70. | IR5/I | Transfer instruction register bit 5 to interrupt mask flag |
| 71. | LIR | Load instruction register |
| 72. | ML | Enable memory lock output |
| 73. | NEG/AYH | Transfer NEG latch to ALU Y input high |
| 74. | O1/CIH | Force 1 to ALU carry in |

TABLE 2-continued

| Sum-of-Minterm Number | Symbol | Description |
|---|---|---|
| 75. | O1/CIL | Force 1 to ALU carry in low |
| 76. | OLH/DBO | Transfer output latch high to output data bus |
| 77. | OLL/DBO | Transfer output latch low to output data bus |
| 78. | OR | Force OR operation in ALU |
| 79. | P/DBL | Transfer processor status register to data bus low |
| 80. | PBR/DBL | Transfer program bank register to data bus low |
| 81. | PBR/DBO | Transfer program bank register to output data bus |
| 82. | PC/AB | Transfer program counter register to address bus |
| 83. | PC/DB | Transfer program counter register to data bus |
| 84. | PI/AB | Transfer program incrementor to address bus |
| 85. | PI/DB | Transfer program incrementor to data bus |
| 86. | PICIN | Increment program incrementor |
| 87. | R0 | Reset timing generator bit 0 |
| 88. | R1 | Reset timing generator bit 1 |
| 89. | R2 | Reset timing generator bit 2 |
| 90. | RABORT1 | Reset abort latch |
| 91. | S/AB | Transfer stack register to address bus |
| 92. | S/SB | Transfer stack register to special bus |
| 93. | S0 | Set timing generator bit 0 |
| 94. | S1 | Set timing generator bit 1 |
| 95. | S2 | Set timing generator bit 2 |
| 96. | S3 | Set timing generator bit 3 |
| 97. | SB/AB | Transfer special bus to address bus |
| 98. | SB/S | Transfer special bus to stack register |
| 99. | SB/X | Transfer special bus to X register |
| 100. | SB/Y | Transfer special bus to Y register |
| 101. | SBH/AYH | Transfer special bus high to ALU Y input high |
| 102. | SBH/B | Transfer special bus high to B accumulator |
| 103. | SBL/A | Transfer special bus low to A accumulator |
| 104. | SBL/AYL | Transfer special bus low to ALU Y input low |
| 105. | SDD | Substract decimal |
| 106 | SR | Force shift right operation in ALU |
| 107. | SR8/A7L | Transfer ALU bit 8 to ALU bit 7 |
| 108. | STP | Stop the clock |
| 109. | SUM | Force sum operation in ALU |
| 110. | T/DBO/1 | Transfer temporary register to output data bus during phase 2 low time |
| 111. | T/DBO/2 | Transfer temporary register to output data bus during phase 2 high time |
| 112. | TSTL/Z | Transfer test low byte to zero flag |
| 113. | TSTLH/Z | Transfer test word to zero flag |
| 114. | V/ADL | Transfer vector to address bus low |
| 115. | VDA | Enable valid data address output |
| 116. | VH/V | Transfer ALU overflow high to V flag |
| 117. | VL/V | Transfer ALU overflow low to V flag |
| 118. | VPA | Enable valid program address output |
| 119. | WAI | Force wait operation |
| 120. | WRITE | Enable write operation |
| 121. | X/AB | Transfer X register to address bus |
| 122. | X/SB | Transfer X register to special bus |
| 123. | XCE | Exchange carry and emulation bits in status register |
| 124. | Y/SB | Transfer Y register to special bus |
| 125. | Z0/ADL0 | Force 0 on address bus bit 0 |
| 126. | Z0/AYH | Force zeros on ALU Y input high |
| 127. | Z0/AYL | Force zeros on ALU Y input low |
| 128. | Z0/CIH | Force zero into ALU carry in high |
| 129. | Z0/DB | Force zeros on data bus |
| 130. | Z0/DBO | Force zeros on output data bus |
| 131. | ZL/Z | Transfer byte zero detect output to Z flag |
| 132. | ZLH/Z | Transfer word zero detect output to Z flag |

In Table 2, the term "data bus low" refers to the low order byte on internal data bus 141, and similarly the term "data bus high" refers to the high data byte thereon. The term "special bus low" refers to the low order byte on internal special bus 114, and similarly for the term "special bus high". The same convention applies to the terms "address bus high" and "address bus low" with reference to internal address bus 103. The arithmetic logic unit circuitry of the chip 100 includes the high and low order binary and decimal arithmetic logic circuitry indicated in FIG. 1. Each such arithmetic logic circuitry includes an X input and a Y input which is referred to in various of the minterm descriptions in Table 2. The "input data bus" referred to in Table 2 refers to the bus going from the data bus/bank address buffer 105 to the sixteen bit data latch 106. The "output data bus" referred to in Table 2 refers to the eight bit bus going from program bank register 155, data bank register 156 and data latch circuit 106 to data bus/bank address buffer circuitry 105.

Next, important new functional sections in the sixteen bit microprocessor chip 100 which are not included in the microprocessor described in the above-referenced parent application are described with reference to FIGS. 13 through 19, including the emulation bit circuitry, the abort circuitry, the valid program address circuitry, the valid program address circuitry, the valid data address circuitry, the vector pull circuitry, improvements to the ready circuitry, and the M/X output circuitry.

Figure 13:
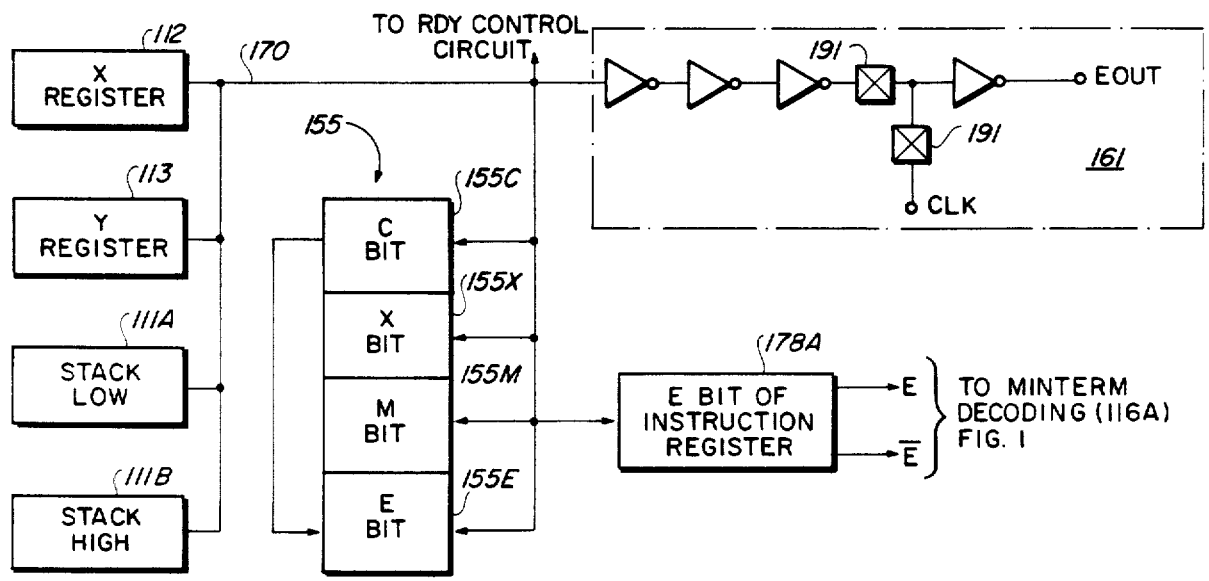
FIG. 13 is a logic diagram illustrating the emulation circuitry generally indicated in FIGS. 1 and 4.

Referring now to FIG. 13, reference numeral 161 designates the emulation bit output logic indicated in FIG. 1. The signal $E_{OUT}$ is an output signal that simply indicates whether microprocessor chip 100 is presently emulating the 6502 microprocessor, enabling external circuitry such as a memory controller or the like to readily determine how memory should be accessed. As in FIG. 1, reference numeral 155 designates the program status register. The C or carry bit, the X bit, the M bit, and the emulation or E bit are designated by reference numerals 155C, 155X, 155M and 155E, respectively. These bits are all connected to a conductor 170 that in turn is connected to an E bit 178A of instruction register 178 (FIGS. 1 and 4) which generates the E and E* lines that extend through the N-channel minterm decode circuitry 116A. Conductor 170 is also connected to X register 112, Y register 113, low order stack register 111A, high order stack register 111B, and to the input of the emulation output circuitry 161. The function of the emulation signal on conductor 170, if E is a "one", i.e., if the chip is emulating a 6502 microprocessor, is to produce a "one" on conductor 170 that causes $E_{OUT}$ to be a logical "one", forces a logical "one" into the X and M bits 155X and 155M, respectively, of the status register 155, an in effect only allows transfers out of the low order bytes of registers 112 113, 111A, and 111B, and causes certain minterm decoding operations in circuitry 116A which are particular to the emulation mode of operation of chip 100. More particularly, if the E bit is a "one", this causes "zeros" to be forced into the high byte of each of registers 112 and 113 and forces a hexadecimal zero one into high order stack byte 111B.

The blocks 191 and emulation output logic 161 simply designate metal options on the metal layer of FIG. 12 which disconnect inverter 192 if chip 100 is packaged in the package of FIG. 20B (which is pin compatible with the 6502 microprocessor) and cause pin 35 of the package to be disconnected, as indicated by "N/C" in FIG. 20B.

Referring next to FIG. 14, the abort logic 167 of FIG. 1 is shown in detail. The ABORT signal is an input signal that is generated in response to external circuitry that detects an abort condition, for example an incorrect address on the address lines 101 (FIG. 4). The abort input conductor 193 is connected to a string of three inverters 194 and a clocked latch circuit 195 which can be reset by either the reset signal on pin 40 (FIG. 20A) or an internal circuitry RABORT (reset abort) signal which is generated when execution of an abort subroutine is completed.

The P-channel MOSFET designated by reference numeral 196 is a typical "pull up" resistance that maintains conductor 193 at a high level unless the negative-going ABORT signal is applied thereto. Clock latch 195 is clocked by a signal $\phi 21$, an internal clock signal derived from the clock generator circuitry 156 in FIGS. 1 and 4 that gates or synchronizes all input gate transfers in the chip 100. Other internally generated clock signals referred to in FIGS. 14–19 include $\phi 20$, which synchronizes all transfers from outputs of latches in the chip 100, $\phi 20$, a delayed replica of $\phi 2$. $\phi 4$ is an internal transfer clock signal which generally performs the function of internal transfer timing for registers. $\phi 40$ is a slightly delayed version of $\phi 4$ which is required to precharge the instruction decode logic.

The output of clocked latch 195 is inverted and applied to a latch circuit 197 to generate a signal (ABORT.$\phi 1^*$) which causes abort vector-generating circuitry 198 (which can be readily implemented by those skilled in the art) to force a vector address on address bus 101 (FIG. 4) representing the location of an abort subroutine that must be executed next. ($\phi 1$ is simply an alternate way of describing $\phi 2$ low time.)

The signal on conductor 199 is clocked into circuitry by the clock signal $\phi 21$. Herein, the symbols such as 200 designate CMOS transfer gates, which are well-known to those skilled in the art and simply constitute a P-channel MOSFET and an N-channel MOSFET having common sources and common drains. The small circle 201 on each CMOS transfer gate designates the gate electrode of the P-channel MOSFET. The opposite input designates the gate electrode of the N-channel MOSFET.

The (ABORT)* signal on conductor 199 is clocked into latch circuitry 202 by a pair of CMOS transfer gates of the type described above in response to a signal LIR (load instruction register) and is further synchronized from the output of the latch 202 into another latch 203 by another pair of CMOS transfer gates and in synchronization with the signal $\phi 4$. The output of the latch 203 is the (ABORT)* signal on conductor 169, which is routed to registers 107, 112, 113, 111A, 111B, 109A, 109B, 160, 117, 155, and 156 as previously described to prevent any transfers of data into those registers until the abort subroutine has been executed and the reset abort (RABORT) signal has been generated.

Referring next to FIG. 15, the valid program address (VPA) circuitry 157A shown in FIG. 1 produces a signal VPA as an output on conductor 204, which is wire bonded to lead 7 of the package shown in FIG. 20A. A sum-of-minterm transfer signal produced in sum-of-minterm decoding circuitry 116B (FIGS. 1 and 2) produces a signal that is synchronized with the clock signal $\phi 40$ and is gated by a "hold program incrementer" signal (HLDPI)*, latched by $\phi 4$ and ultimately produced on conductor 204 when the present address being output on address bus 101 (FIG. 4) is a program address, i.e., an address of a location in a slow memory, such as a read-only memory or a disc. The valid progam address signal on conductor 204 can also caused to be a "zero" in response to the (HLDPI)* or forced break (FRCBRKL) forced break condition due to a hardware interrupt.

The two metal options designated by reference numeral 205 disable the VPA output on conductor 204, if the chip 100 is packaged in the pin compatible 6502 package of FIG. 20B.

Referring now to FIG. 16, the valid data address (VDA) circuitry 164 of FIG. 1 is shown in detail. The VDA signal is produced on conductor 206. It is generated as a result of a sum-of-minterm transfer signal (VDA)* produced on conductor 207 by sum-of-minterm decoding circuitry 116B (FIGS. 1, 2, and 4). After being latched by the clock signal $\phi 4$ and ANDed with the reset signal, and further latched in synchronization with the signal $\phi 20$ and inverted, the VDA signal is produced on conductor 206. The circuitry 208 in FIG. 16 shows how the signal $\phi 20$ is derived from $\phi 21$ when the ready (RDY)* signal produced in block 166 FIG. 1 and FIG. 4 is latched to a low level. This circuit is similar to the VPA circuit of FIG. 16, except that the VDA signal is at a logical "one" when the address presently being produced on address bus 101 is the location of data (rather than program instructions) stored in a fast memory, and enables an external circuit such as a memory controller to generate a high speed clock that is suitable for accessing a fast RAM. This is more convenient than use of the valid memory address (VMA) produced by some other microprocessors, which do not distinguish between slow program memory and high speed data memory.

Referring now to FIG. 17, the vector pull circuitry of block 165 of FIG. 1 is shown. This circuit produces a logical "zero" on conductor 209 during the two cycles when a vector address is being output on address bus 101. This enables a system using the microprocessor 100 to conveniently modify and/or prioritize interrupt routines, rather than using an entire separate interrupt priority allocation circuit. Whenever an interrupt or abort operation occurs, any vector interrupt system, including the one in chip 100, causes vector transfer signals 210 to be applied to vector control circuitry such as 211 that forces a particular vector address into the address 121 and 120 of FIG. 4. Those skilled in the art can easily provide input devices which, when enabled by the vector transfer signals 210, force logical "ones" and/or "zeros" into the inputs of the appropriate bits of the address buffers 120 and 121 to load the appropriate vector address therein. Vector control circuitry 211 simply generates a vector pull (VP) signal on conductor 212 whenever this happens. This signal is synchronized with the clock $\phi 20$ and latched into a latch 165A, inverted, and produced on conductor 209.

Figure 18:
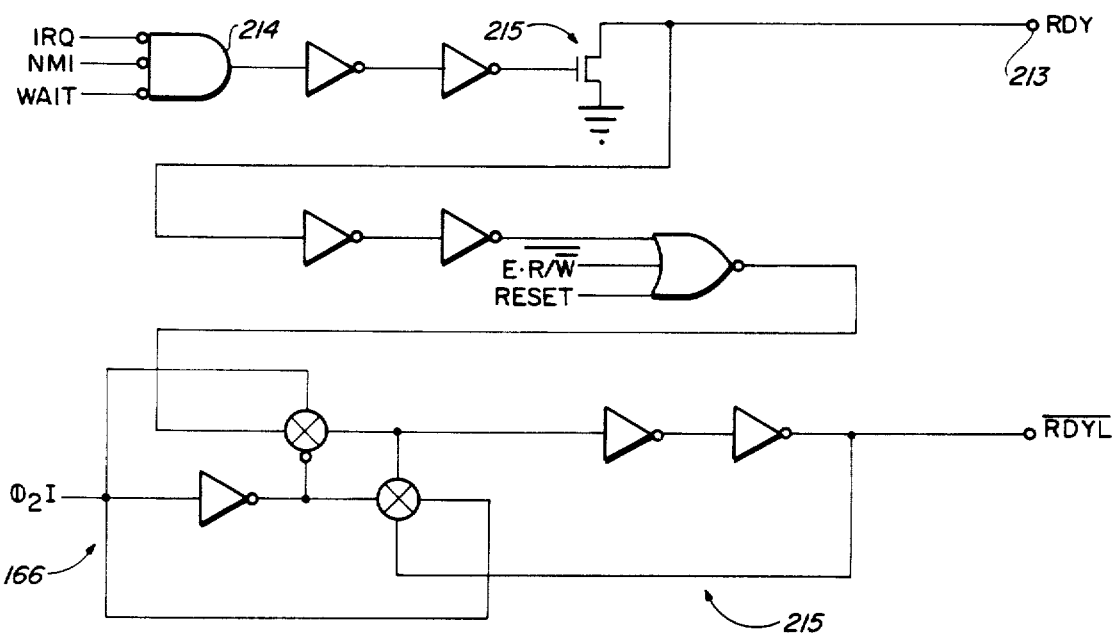
FIG. 18 is a logic diagram of the ready (RDY) circuitry indicated in FIGS. 1 and 4.

Referring now to FIG. 18, new circuitry 166 is shown which produces the signal RDY as a low output level on conductor 213 in response to a wait (WAIT) command applied to one of the inputs of NAND gate 214. This signal is buffered by two cascaded inverters and is applied to an N-channel MOS transistor 215, the drain of which is connected to conductor 213. The IRQ and NMI signals are conventional, but the wait instruction (WAIT) described in Appendix A simply pulls the RDY signal low. This provides an advantage of a simple implementation of the wait for interrupt function. The RDY signal on conductor 213 can also be an input which is loaded into latch circuitry 215 in synchronization with the $\phi 2I$ signal, except during a write operation when the chip 100 is emulating a 6502 microprocessor to produce the (RDYL)* signal mentioned above.

The occurrence of either an IRQ or NMI signal disables the wait instruction, allowing conductor 213 to return to its normal high state.

Figure 19:
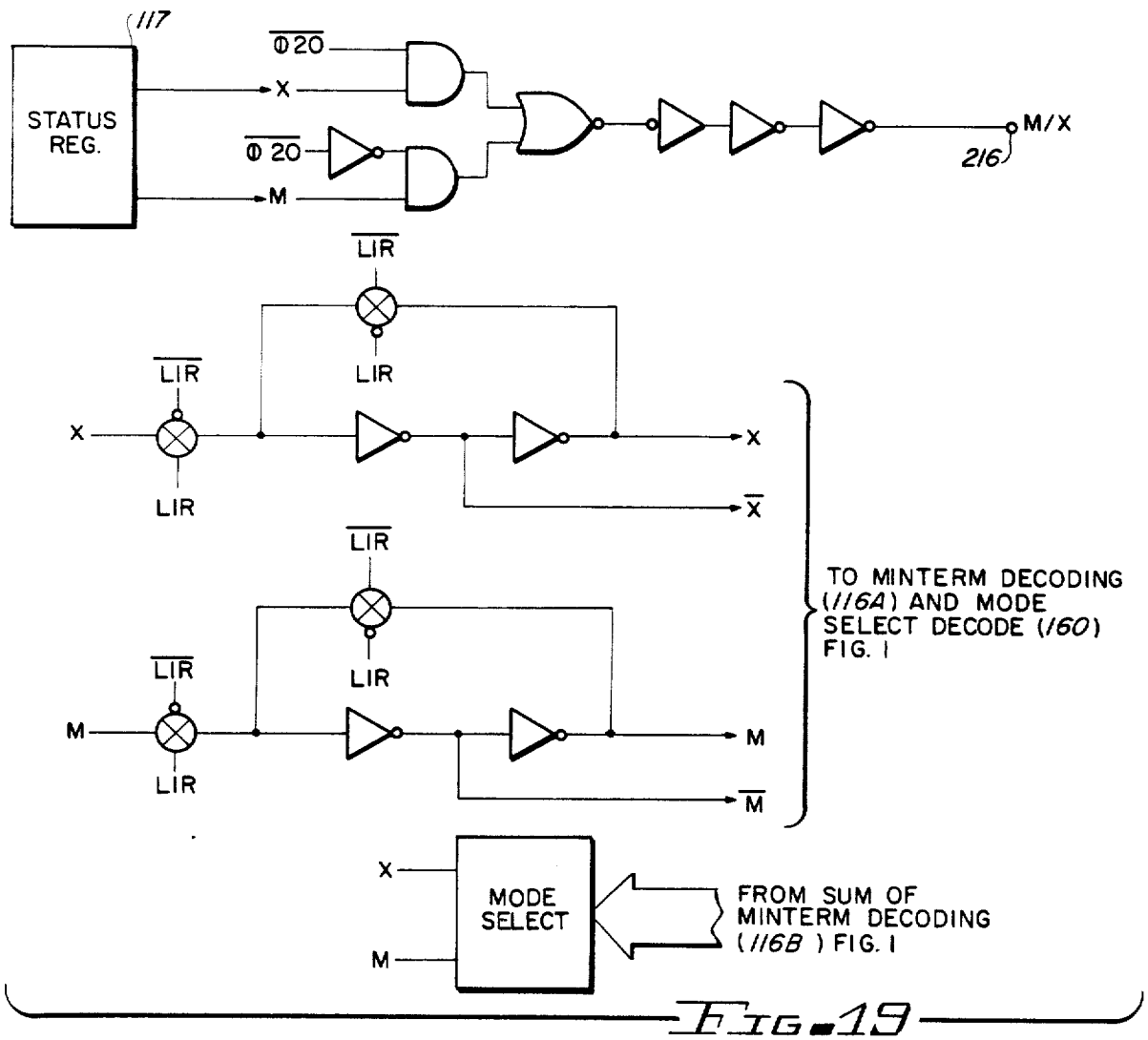
FIG. 19 is a logic diagram of the M/X and mode select decoding circuitry indicated in FIGS. 1 and 4.

Referring next to FIG. 19, the new M/X output logic circuitry 117A of FIG. 1 is shown. This circuitry simply provides a multiplexed output signal M/X on conductor 216 that, during $\phi 1$ high time indicates the value of the M bit in status register 117 and during $\phi 1$ low time indicates the value of the X bit in status register 117. This Signal may be useful to external circuitry, such as a memory controller, enabling it to anticipate the operation about to be performed by the incoming op code. The X and M outputs of status register 117 are synchronized by the clock and applied directly, after appropriate inversion and buffering, to conductor 216. The X and M outputs of status register 17 are also transferred in response to an LIR (load instruction register) command into two instruction register latches 217 and 218 to produce the signals and complements routed into the minterm decoding circuitry 116A and also to mode select decode circuitry 160.

In accordance with the present invention, the sixteen bit microprocessor chip 100 executes eight bit op codes, rather than sixteen bit op codes. Most prior sixteen bit microprocessors execute sixteen bit op codes. The eight bit op codes include, as a subset, all of the eight bit op codes of the prior 6502 microprocessor. This enables the sixteen bit microprocessor chip 100 to execute software written for the eight bit 6502 microprocessor. The M bit, the X bit and the E bit can be thought of as "op code extensions" which extend the eight bit op code to effectuate execution of a larger number of instructions having eight bit op codes in either an eight bit or a sixteen bit mode, i.e., wherein the internal data words are eight bits wide or sixteen bits wide, respectively. The way in which this is done can be illustrated with an example of how an LDA (load accumulator) instruction is executed. The op code table on page 10 of Appendix A, which lists all of the hexadecimal op codes for all of the instructions of the hexadecimal op codes for all of the codes for the LDA instruction is A5. For the initial part of this example, assume that M is a "one", indicating that sixteen bit operation is desired. The eight bit op code A5 is loaded into the instruction register, along with E, M and X and these are decoded in minterm decoding read-only memory 166A to produce minterm signals which are inverted by minterm inverters 116C. Further decoding then is done on the inverted minterm signals by the sum-of-minterm read-only memory 116B to produce appropriate sum-of-minterm signals. The "one" level of the M bit is then used in the mode select decode circuitry 160 to "select" the appropriate sum of minterm signal as a transfer signal for causing the highest order bit (i.e., of the low order byte on the internal data bus 141 (FIG. 4) to be loaded into the N bit of status register 117, since for eight bit operation, the highest order bit on an eight bit data bus would be loaded into the N (negative) bit of the status register for certain instructions.

However, if the M bit is a "zero" instead of a "one", indicating that sixteen bit operation is desired, the operation is similar in that the same op code A5 for the LDA instruction is located into the instruction register and is decoded, with E, M, and X, in the minterm decoding read-only memory 116 A and sum-of minterm decoding circuitry 116B, but this time the complement of the M bit, i.e., M*, is used to t ransfer the highest order bit of the upper byte of the internal data bus 141, i.e., bit 15, into the N bit of the status register 117, since for sixteen bit operation this is the bit that must be loaded into the N (negative) bit of the status register for the same instructions to indicate whether the number on the data bus is a positive number or a negative number.

The above-described sixteen bit microprocessor chip 100 provides a number of advantages that are expected to result in a "breakthrough" in microprocessor chip design by providing very high speed sixteen bit internal operation with a number of new features that greatly simplify the design of low cost computerized systems and allow the sixteen bit microprocessor to easily execute software that has been previously written for the eight bit 6502 microprocessor, and even allows the sixteen bit microprocessor chip to emulate the prior 6502 microprocessor, and achieves this result in a high speed, low power CMOS chip that require less than half as much chip area as prior sixteen bit microprocessors which utilize the generally more area consuming NMOS (N channel MOS) manufacturing technology. The sixteen bit microprocessor chip 100 provides three convenient ways of stopping the clock, by executing a wait instruction, by pulling the "RDY" input to a low level, or executing a "stop the clock" instruction referred to in Appendix A. The provision of simple output circuitry that produces the VPA (valid program address) and VMA (valid memory address) signals allows very convenient use of these signals to determine memory clock speeds in accordance with whether data addresses or program addresses are presently being output, and hence whether high speed data or scratch memory is required or low speed program memory is being addressed. The prior approach would have required execution of a subroutine to produce data indicative of the type of memory being addressed, and decoding of that data by means of external circuitry in order to produce the external signals necessary to accomplish the same result. The vector pull (VP) signal can in some cases simplify vector prioritizing schemes. The abort circuitry allows retention of all data stored in registers accessable by the programmer to be retained, so that at the end of an abort operation, it is not necessary to go all the way back to the beginning of a subroutine in order to complete execution of the subroutine.

While the invention has been described with reference to a particular embodiment thereof, those skilled in the art will be able to make various modifications to the described embodiment of the invention without departing from the true spirit scope thereof. It is intended that operating steps and structural features which are equivalent to those in the described embodiment in that they perform substantially the same work in substantially the same way to achieve substantially the same results are within the scope of the invention. For example, a 32 bit microprocessor may be designed according to the same principles, and could execute the same 8 bit op codes as the above described microprocessor chip 100.

Appendix A

W65SC816

OXI-CMOS W65SC8XX and W65SC9XX 16-Bit Microprocessor Family

Features

- Advanced CMOS design for low power consumption and increased noise immunity
- Single +5V power supply
- Emulation mode allows complete hardware and software compatibility with NMOS 6502 code
- 24-bit address bus allows access to 16 MBytes of memory space
- Full 16-bit ALU, Accumulator, Stack Pointer, and Index Registers
- Valid Data Address (VDA) and Valid Program Address (VPA) output allows dual cache and cycle steal DMA implementation
- Vector Pull (VP) output indicates when interrupt vectors are being addressed. May be used to implement vectored interrupt design
- Abort (ABORT) input and associated vector supports interrupting any instruction without modifying memory or registers
- Separate program and data bank registers allow program segmentation
- New Direct Register allows "zero page" addressing anywhere in first 64K bytes
- 24 addressing modes — 13 original 6502 modes, plus 11 new addressing modes
- New Wait for Interrupt (WAI) and Stop the Clock (STP) instructions further reduce power consumption, decrease interrupt latency and allows synchronization with external events
- New Co-Processor instruction (COP) with associated vector supports co-processor configurations, i.e., floating point processors
- New block move ability

General Description

WDC's W65SC802 and W65SC816 are OXI-CMOS 16-bit microprocessors featuring total software compatibility with their 8-bit NMOS and CMOS 6500-series predecessors. The W65SC802 is pin-to-pin compatible with 8-bit devices currently available, while the W65SC816 extends addressing to a full 16 megabytes. These devices offer the many advantages of WDC's OXI-CMOS technology, including increased noise immunity, higher reliability, and greatly reduced power requirements. A software switch determines whether the processor is in the 8-bit "emulation" mode, or in the full 16-bit mode, thus allowing existing systems to use the expanded features.

As shown in the processor programming model, the Accumulator, ALU, X and Y Index registers, and Stack Pointer register have all been extended to 16 bits. A new 16-bit Direct Page register augments the Direct Page addressing mode (formerly Zero Page addressing). Separate Program Bank and Data Bank registers allow 24-bit memory addressing.

Four new signals provide the system designer with many options. The ABORT input can interrupt the currently executing instruction without modifying internal registers. Valid Data Address (VDA) and Valid Program Address (VPA) outputs facilitate dual cache memory by indicating whether a data segment or program segment is accessed. Modifying a vector is made easy by monitoring the Vector Pull (VP) output.

W65SC816 Processor Programming Model

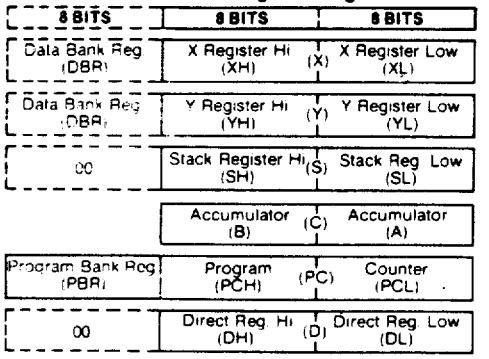

Pin Configuration

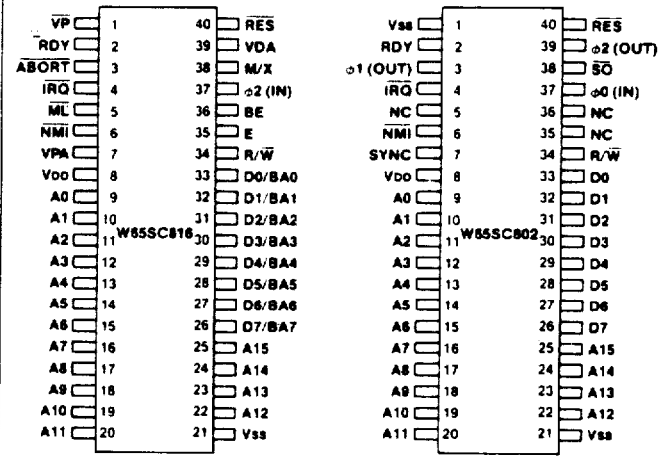

Status Register Coding

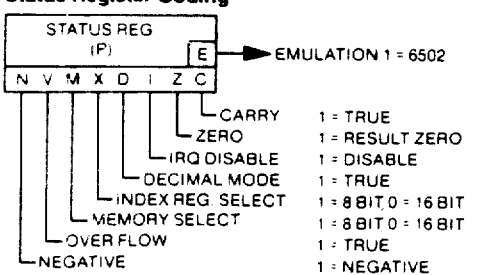

 THE WESTERN DESIGN CENTER, INC.

Advance Information Data Sheet:
This is advanced information and specifications are subject to change without notice.

Absolute Maximum Ratings: (Note 1)

| Rating | Symbol | Value |
|---|---|---|
| Supply Voltage | VDD | -0.3V to +7.0V |
| Input Voltage | VIN | -0.3V to VDD +0.3 |
| Operating Temperature | TA | -40°C to +85°C |
| Storage Temperature | TS | -55°C to +150°C |

This device contains input protection against damage due to high static voltages or electric fields; however, precautions should be taken to avoid application of voltages higher than the maximum rating.

Notes:
1. Exceeding these ratings may cause permanent damage, functional operation under these conditions is not implied.

DC Characteristics: VDD = 5.0V ± 10%, VSS = 0V, TA = -40°C to +85°C

| Parameter | Symbol | Min | Typ | Max | Unit |
|---|---|---|---|---|---|
| Input High Voltage | VIH | | | | |
| φ0(IN) | | VSS + 2.4 | — | VDD + 0.3 | V |
| φ2(IN), CLK(IN) | | VDD - 0.2 | — | VDD + 0.3 | V |
| RES, NMI, RDY, IRQ, Data, SO, DBE, BE, ABORT | | VSS + 2.0 | — | VDD + 0.3 | V |
| Input Low Voltage | VIL | | | | |
| φ0(IN) | | VSS - 0.3 | — | VSS + 0.4 | V |
| φ2(IN), CLK(IN) | | VSS - 0.3 | — | VSS + 0.2 | V |
| RES, NMI, RDY, IRQ, Data, SO, DBE, BE, ABORT | | VSS - 0.3 | — | VSS + 0.8 | V |
| Input Leakage Current (VIN = 0 to 5.25V, VDD = 5.25V) | IIN | | | | |
| RES, NMI, RDY, IRQ, SO, DBE, BE, ABORT (Internal Pull-Up) | | -100 | — | 1.0 | μA |
| φ2(IN), φ0(IN), CLK(IN) | | -1 | — | 1.0 | μA |
| Address, Data, R/W (Off State) | | -10 | — | 10.0 | μA |
| Output High Voltage (IOH = -100 μA, VDD = 4.75V) | VOH | | | | |
| SYNC, Data, A0-A15, R/W, ML, BKO, VP, VDA, VPA | | VSS = 2.4 | — | — | V |
| Output Low Voltage (IOL = 1.6 mA, VDD = 4.75V) | VOL | | | | |
| SYNC, Data, A0-A15, R/W, ML, BKO, VP, VDP, VPA | | — | — | VSS + 0.4 | V |
| Supply Current    f = 1 MHz | ICC | — | — | 5 | mA |
| f = 2 MHz | | | | 10 | mA |
| f = 3 MHz | | | | 15 | mA |
| f = 4 MHz | | | | 20 | mA |
| Capacitance (VIN = 0, TA = 25°C, f = 1 MHz) | | | | | |
| Logic, φ0(IN), CLK(IN) | CIN | — | — | 10 | pF |
| A0-A15, R/W, Data (Off State) | CTS | — | — | 15 | pF |
| φ2(IN) | C2(IN) | — | — | 30 | pF |

AC Characteristics, W65SC816 (Simplified): VDD = 5.0V ± 10%, VSS = 0V, TA = -40°C to +85°C

| Parameter | Symbol | 2 MHz Min | 2 MHz Max | 4 MHz Min | 4 MHz Max | 8 MHz Min | 8 MHz Max | 10 MHz Min | 10 MHz Max | Unit |
|---|---|---|---|---|---|---|---|---|---|---|
| Cycle Time | tCYC | 500 | DC* | 150 | DC* | 125 | DC* | 100 | DC* | nS |
| Clock Pulse Width Low | tPW(φ2L) | 240 | 1mS* | 115 | 1mS* | 58 | 1mS* | 46 | 1mS* | nS |
| Clock Pulse Width High | tPW(φ2H) | 240 | DC* | 115 | DC* | 58 | DC* | 46 | DC* | nS |
| Fall Time, Rise Time | tF, tR | — | 25 | — | 15 | — | 4.5 | — | 4.0 | nS |
| Address Hold Time | tAH | 10 | — | 10 | — | 5.0 | — | 4.0 | — | nS |
| Address Setup Time | tADS | — | 140 | — | 90 | — | 35 | — | 28 | nS |
| Access Time | tACC | 310 | — | 110 | — | 65 | — | 60 | — | nS |
| Read Data Hold Time | tDHR | 10 | — | 10 | — | 5.0 | — | 4.0 | — | nS |
| Read Data Setup Time | tDSA | 50 | — | 50 | — | 15 | — | 12 | — | nS |
| Write Data Delay Time | tMDS | — | 100 | — | 70 | — | 35 | — | 28 | nS |
| Write Data Hold Time | tDHW | 10 | — | 10 | — | 5.0 | — | 5.0 | — | nS |
| SO Setup Time | tSO | 50 | — | 25 | — | 25 | — | 20 | — | nS |
| Processor Control Setup Time | tPCS | 200 | — | 120 | — | 50 | — | 40 | — | nS |
| M/X Output Setup | tXM | 50 | — | 50 | — | 15 | — | 12 | — | nS |
| M/X Output Holding Time | tXMH | 10 | — | 10 | — | 5.0 | — | 4.0 | — | nS |

*Not tested

Simplified Timing Diagram, W65SC816

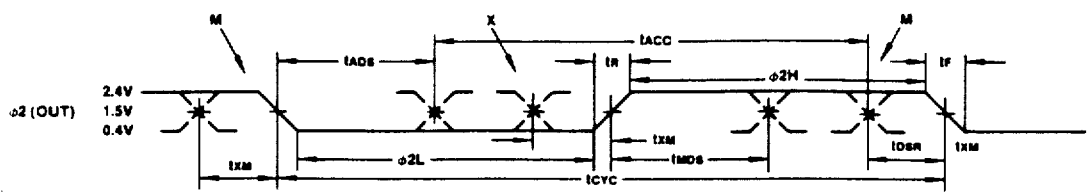

NOTES:
1. tACC = tCYC - (tADS + tDSR)
2. tR and tF (for all input and output) measured from 0.4V to 2.4V
3. All times are measured from 1.5V level

AC Characteristics, W65SC816, W65SC802 (W65SC02 Compatible): $V_{DD} = 5.0V \pm 10\%$, $V_{SS} = 0V$, $T_A = -40°C$ to $+85°C$

| Parameter | Symbol | 1 MHz Min | 1 MHz Max | 2 MHz Min | 2 MHz Max | 3 MHz Min | 3 MHz Max | 4 MHz Min | 4 MHz Max | Unit |
|---|---|---|---|---|---|---|---|---|---|---|
| Delay Time, φ0 (IN) to φ2 (OUT) | tDφ0 | — | 100 | — | 100 | — | 100 | — | 100 | nS |
| Delay Time, φ2 (IN) to φ2 (OUT) | tDφ2 | — | 75 | — | 75 | — | 75 | — | 75 | nS |
| Delay Time, φ1 (OUT) to φ2 (OUT) | tDφ1 | — | 50 | — | 50 | — | 50 | — | 50 | nS |
| Cycle Time | tCYC | 1.0 | DC | 0.50 | DC | 0.33 | DC | 0.25 | DC | μS |
| Clock Pulse Width Low | tPW(φ2L) | 470 | — | 240 | — | 160 | — | 115 | — | nS |
| Clock Pulse Width High | tPW(φ2H) | 470 | — | 240 | — | 160 | — | 115 | — | nS |
| Fall Time, Rise Time | tF, tR | — | 25 | — | 25 | — | 15 | — | 15 | nS |
| Address Hold Time | tAH | 10 | — | 10 | — | 10 | — | 10 | — | nS |
| Address Setup Time | tADS | 225 | — | 140 | — | 110 | — | 90 | — | nS |
| Access Time | tACC | 650 | — | 310 | — | 170 | — | 110 | — | nS |
| Read Data Hold Time | tDHR | 10 | — | 10 | — | 10 | — | 10 | — | nS |
| Read Data Setup Time | tDSR | 100 | — | 50 | — | 50 | — | 50 | — | nS |
| Write Data Delay Time | tMDS | — | 175 | — | 100 | — | 75 | — | 70 | nS |
| Write Data Hold Time | tDHW | 10 | — | 10 | — | 10 | — | 10 | — | nS |
| SO Setup Time | tSO | 100 | — | 50 | — | 35 | — | 25 | — | nS |
| Processor Control Setup Time | tPCS | 200 | — | 200 | — | 150 | — | 120 | — | nS |

AC Characteristics, W65SC902 (W65SC102 Compatible): $V_{DD} = 5.0V \pm 10\%$, $V_{SS} = 0V$, $T_A = -40°C$ to $+85°C$

| Parameter | Symbol | 1 MHz Min | 1 MHz Max | 2 MHz Min | 2 MHz Max | 3 MHz Min | 3 MHz Max | 4 MHz Min | 4 MHz Max | Unit |
|---|---|---|---|---|---|---|---|---|---|---|
| Delay Time, CLK (IN) to φ2 (OUT) | tDCLK | — | 100 | — | 100 | — | 100 | — | 100 | nS |
| Delay Time, OSC (OUT) to φ2 (OUT) | tDOSC | — | 75 | — | 75 | — | 75 | — | 75 | nS |
| Cycle Time | tCYC | 1.0 | DC | 0.50 | DC | 0.33 | DC | 0.25 | DC | μS |
| Clock Pulse Width Low | tPW(φ2L) | 470 | — | 240 | — | 160 | — | 115 | — | nS |
| Clock Pulse Width High | tPW(φ2H) | 470 | — | 240 | — | 160 | — | 115 | — | nS |
| Fall Time, Rise Time | tF, tR | — | 25 | — | 25 | — | 15 | — | 15 | nS |
| Delay Time, φ2 (OUT) to φ4 (OUT) | tAVS | — | 250 | — | 125 | — | 83 | — | 63 | nS |
| Address Valid to φ4 (OUT) | tAφ4 | 50 | — | 25 | — | 16 | — | 12 | — | nS |
| Address Hold Time | tAH | 10 | — | 10 | — | 10 | — | 10 | — | nS |
| Access Time | tACC | 695 | — | 340 | — | 220 | — | 170 | — | nS |
| Read Data Hold Time | tDHR | 10 | — | 10 | — | 10 | — | 10 | — | nS |
| Read Data Setup Time | tDSR | 80 | — | 40 | — | 30 | — | 20 | — | nS |
| Write Data Hold Time | tDHW | 10 | — | 10 | — | 10 | — | 10 | — | nS |
| Write Data Delay Time | tDDφ4 | — | 200 | — | 110 | — | 70 | — | 30 | nS |
| SO Setup Time | tSO | 100 | — | 50 | — | 35 | — | 25 | — | nS |
| Processor Control Setup Time | tPCS | 100 | — | 50 | — | 35 | — | 25 | — | nS |

Timing Diagrams (W65SC02 Compatible):
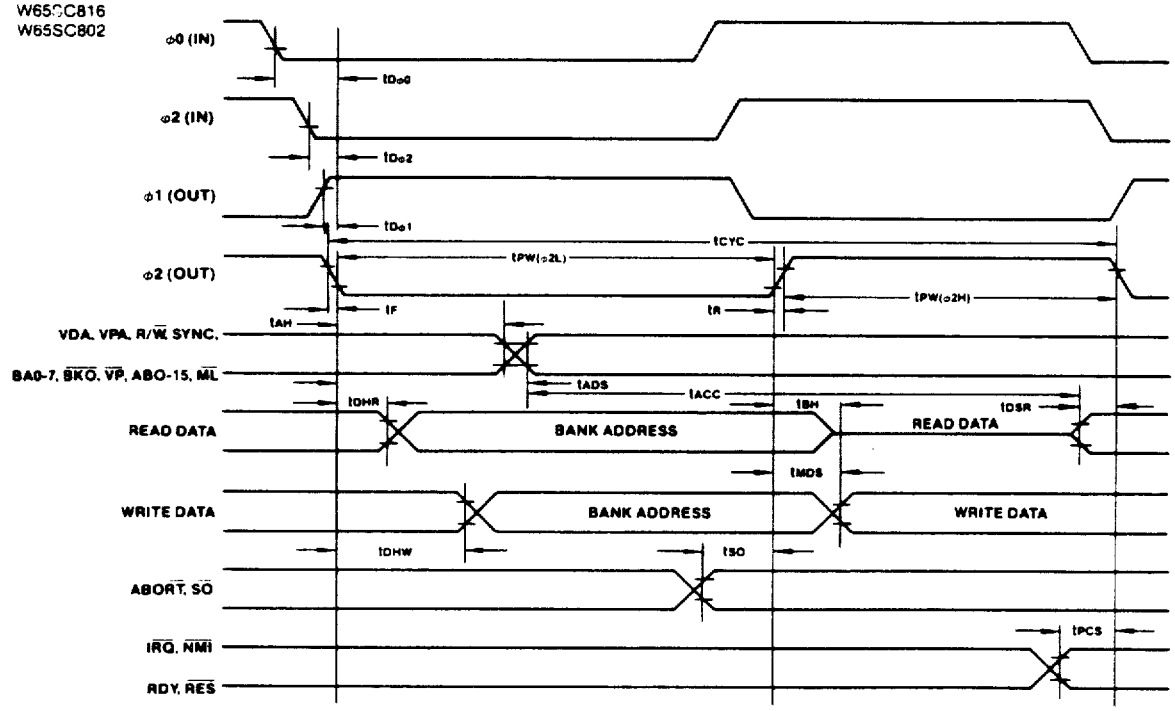
Timing Diagram (W65SC102 Compatible):
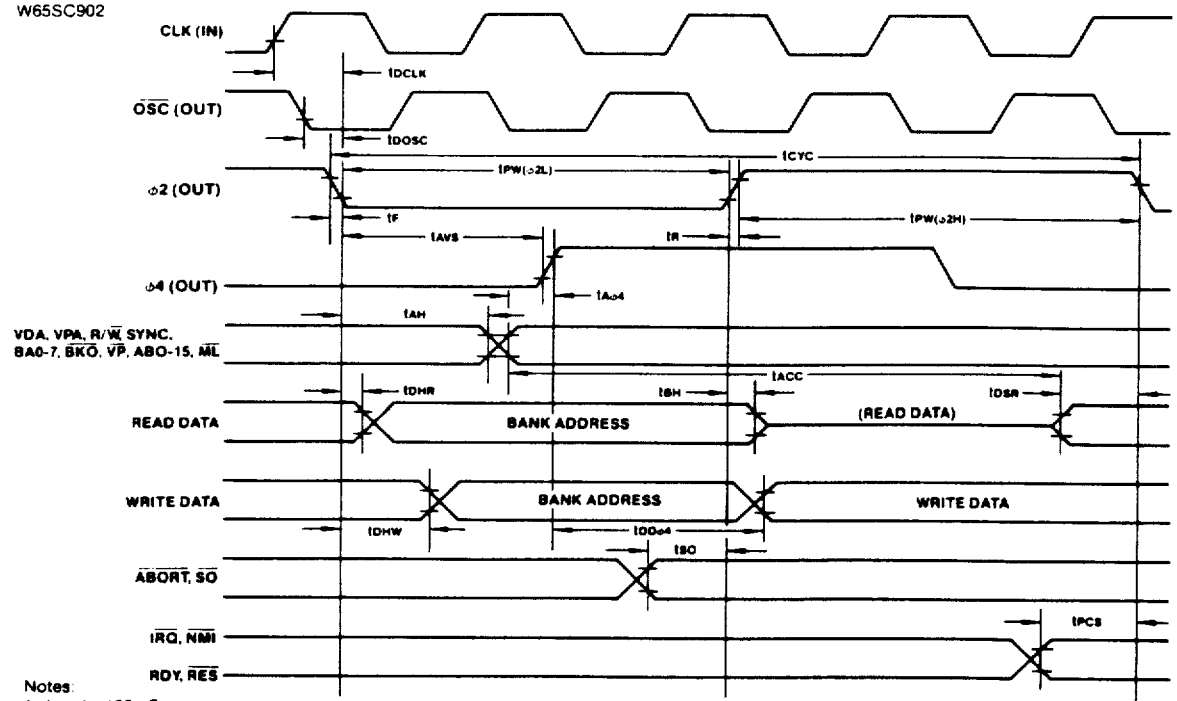
Notes:
1. Load = 100 pF
2. Voltage levels shown are $V_L < 0.4$ V, $V_H > 2.4$ V, unless otherwise specified.
3. Measurement points shown are 0.8 V and 2.0 V, unless otherwise specified.

Table 1. W65SC816 Compatibility Issues

- E = Emulation Bit which defines 6502 emulation mode
- XCE instruction exchanges carry bit C and emulation bit E

|   | W65SC816 | W65SC02 | NMOS 6502 |
|---|----------|---------|-----------|
| 1. S (Stack) | Always page 1 (E = 1) 16 bits when (E = 0) | Always page 1 | Always page 1 |
| 2. X (X Index Register) | Indexed page zero always in page 0 (E = 1). Cross page (E = 0) | Always page 0 | Always page 0 |
| 3. Y (Y Index Register) | Indexed page zero always in page 0 (E = 1). Cross page (E = 0) | Always page 0 | Always page 0 |
| 4. A (Accumulator) | Same | Same | Same |
| 5. P (Flag Register) | N, V, and Z flags valid in decimal mode (D not modified after reset or Interrupt E = 1). (D = 0 after Interrupt E = 0) | N, V, and Z flags valid in decimal mode D = 0 after reset and interrupt | N, V, and Z flags invalid in decimal mode D = unknown after reset D not modified after Interrupt |
| 6. Timing |  |  |  |
| A. ABS, X ASL, DEC, INC LSR, ROL, ROR With No Page Crossing | 7 cycles | 6 cycles | 7 cycles |
| B. Jump Indirect Operand = XXFF | 5 cycles | 6 cycles | 5 cycles and invalid page crossing |
| C. Branch Across Page | 4 cycles (E = 1) 3 cycles (E = 0) | 4 cycles | 4 cycles |
| D. Decimal Mode | No additional cycle | Add 1 cycle | No additional cycles |
| 7. BRK Vector | 00FFFE,F (E = 1) BRK bit = 0 on stack if IRQ, NMI, ABORT. 00FFE6,7 (E = 0) X = X on Stack always | FFFE,F BRK bit = 0 on stack if IRQ, NMI. | FFFE,F BRK bit = 0 on stack if IRQ, NMI |
| 8. Interrupt or Break Bank Address | PBR not pushed (E = 1) RTI PBR not pulled (E = 1) PBR pushed (E = 0) RTI PBR pulled (E = 0) | Not available | Not available |
| 9. Memory Lock (ML) | ML = 0 during Read, Modify and Write cycles | ML = 0 during Modify and Write | Not available |
| 10. Indexed Across Page Boundary | Extra read of last instruction fetch | Extra read of last instruction fetch | Extra read of invalid address |
| 11. RDY Pulled During Write Cycle | Ignored (E = 1) Processor stops (E = 0) | Processor stops | Ignored |
| 12. R/W During Reset Stack Operation | Does not write to stack | Writes to stack | Does not write to stack |
| 13. Unused OP Codes | One reserved Op Code specified as WDM will be used in future systems. The W65SC816 performs a no-operation | No operation | Unknown and some "hang up" processor |
| 14. Bank Address Handling | PBR = 00 after Reset or Interrupts | Not available | Not available |
| 15. R/W During Read-Modify-Write Instructions | E = 1, R/W = 0 during Modify and Write cycles E = 0, R/W = 0 only during Write cycle | R/W = 0 only during Write cycle | R/W = 0 during Modify and Write cycles |
| 16. SYNC (Metal Option) | W65SC802 VPA = SYNC W65SC816 VPA = VPA Always | SYNC Always | SYNC Always |

Signal Description

Address Bus (A0-AXX and DB/BA0-7)
Refer to the particular package configuration for the respective number of address lines.

In the 40-pin package, A0-A15, BA0-BA7 forms a 24-bit address bus for memory and I/O exchanges on the data bus. The address lines are set (See BE below) to the high impedance state by the bus enable (BE) signal. The output of each address line is TTL compatible, capable of driving one standard TTL load and 130 pF.

Bus Enable (BE)
This signal allows external control of the data and the address output buffers and R/W. For normal operation, BE is high causing the address buffers and R/W to be active and the data buffers to be active during a write cycle for external control. BE is held low to disable the buffers.

Clock In (CLK (IN))
The W65SC9XX Series is supplied with an internal clock generator operating at four times the φ2 frequency. The frequency of these clocks is externally controlled by the crystal or oscillator circuit.

Phase 0 In (φ0 (IN)) (For Older System Application)
This is the buffered clock input to the internal clock generator on the W65SC0X series. Clock outputs φ1 (OUT) and φ2 (OUT) are derived from this signal.

Phase 2 In (φ2 (IN))
This is the unbuffered clock input to the internal clock generator. The clock output φ2 (OUT) is derived from this signal. The φ2 (IN) clock is recommended in all new system designs requiring a system φ2.

Data Bus Enable (DBE) (For Older System Application)
This TTL-compatible input allows external control of the three-state data output buffers in normal operation. DBE would be driven by the phase two (φ2) clock thus allowing data input from the microprocessor only during φ2. During the read cycle the data bus buffers are internally disabled, becoming essentially an open circuit. To disable the data bus externally, DBE should be held low.

Data Bus (DB/BA0-7)
The data lines (DB/BA0-7) constitute an 8-bit bidirectional data bus used for data exchanges to and from the device and peripherals. The outputs are three-state buffers capable of driving one TTL load and 130 pF. The data lines are set to the high impedance state by BE or DBE. During φ2 data is transferred to and from memory (or I/O) and during φ1 the bank address (BKO) is output.

Ready (RDY)
This input signal allows the user to single-cycle the microprocessor on all cycles including write cycles. A negative transition to the low state during or coincident with phase one (φ1) will halt the microprocessor with the output address lines reflecting the current address being fetched. This condition will remain through a subsequent phase two (φ2) in which the read signal is low. This feature allows microprocessor interfacing with low speed memory as well as direct memory access (DMA). (See Compatibility Issues for 6502 Emulation.)

Memory Lock (ML)
In a multiprocessor system, ML indicates the need to defer the arbitration of the next bus cycle to ensure the integrity of read-modify-write instructions. ML goes low during ASL, DEC, INC, LSR, ROL, ROR, TRB, TSB memory referencing instructions. This signal is low for the read, modify and write cycles.

Oscillator Out (OSC (OUT))
On the W65SC902 microprocessor an internal inverter is connected between pins 35 and 37. The inverter has sufficient loop gain to provide oscillation using an external crystal.

Phase 1 Out (φ1 (OUT)) (For Older System Application)
This inverted φ2 (OUT) signal provides timing for external R/W operations.

Phase 2 Out (φ2 (OUT))
This signal provides timing for external bus R/W operations. Addresses are valid after the address setup time (tADS) from the falling edge of φ2 (OUT).

Phase 4 Out (φ4 (OUT))
This signal is delayed by tADS from φ2 (OUT). The address output is valid prior to the rising edge of φ4 (OUT).

Read/Write (R/W)
This signal is normally in the high state indicating that the microprocessor is reading data from memory or I/O bus. In the low state the data bus has valid data from the microprocessor to be stored at the address memory location. R/W is set to the high impedance state by BE.

Set Overflow (SO)
A negative transition on this line sets the overflow bit in the status code register. The signal is sampled on the trailing edge of φ1.

RESET (RES)
A positive transition on this line causes an initialization sequence to begin. Reset must be held low for at least two clock cycles after VCC reaches operating voltage from a power down condition. After this time R/W is high and SYNC is low. When a positive edge is detected there is an initialization sequence lasting six clock cycles. Then the interrupt mask flag is set, the decimal mode is cleared and the program counter is loaded with the restart vector from locations 00FFFC (low byte) and 00FFFD (high byte). This is the start location for program control. RDY has no affect when RES is low.

Reset Configuration
When RES is pulled low the following registers are initialized:
```
SH     01
D      0000
XH     00 (X - 1 forces XH to 00)
YH     00 (X - 1 forces YH to 00)
PBR    00
P      M - 1 X - 1 D = 0 I - 1 (N V Z C are not initialized)
DBR    00
```
See Compatibility Issues for 6502 Emulation.

Interrupt Request (IRQ)
This TTL compatible signal requests that an interrupt sequence begin within the microprocessor. The IRQ is sampled during φ2 operation. If the interrupt flag in the processor status register is zero, the current instruction is completed and the interrupt sequence begins during φ1. The program counter, bank register and processor status register are stored in the stack. The microprocessor will then set the interrupt mask flag high so that no further interrupts may occur. At the end of this cycle the program counter low will be loaded from address 00FFFE and program counter high from location 00FFFF, transferring program control to the memory vector located at these addresses. The RDY signal must be in the high state for any interrupt to be recognized. A 3K ohm external resistor should be used for proper wire-OR operation. (See Compatibility Issues for 6502 Emulation.)

Non-Maskable Interrupt (NMI)
A negative-going edge on this input requests that a non-maskable interrupt sequence be generated within the microprocessor. The NMI is sampled during φ2, the current instruction is completed and the interrupt sequence begins during φ1. The program counter is loaded with the interrupt vector from locations 00FFFA (low byte), thereby transferring program control to the non-maskable interrupt routine. However it should be noted this is an edge-sensitive input. As a result, another interrupt will occur if there is another negative-going transition and the program has not returned from a previous interrupt. Also no interrupt will occur if NMI is low and a negative-going edge has not occurred since the last non-maskable interrupt. (See Compatibility Issues for 6502 Emulation.)

Abort Instruction (ABORT)
This input is used to abort instructions, usually due to an address bus condition. An external 3K ohm "pull-up" resistor should be used with this pin. A negative going edge aborts the current instruction from the cycle the ABORT input is pulled low, which internally prevents any all registers from being modified. At the end of the current instruction an interrupt like operation pushes the PC, BR, and P on the stack, the I flag is set and the program counter is loaded with the contents of address locations 00FFF8 and 00FFF9.

Vector Locations

| E = 1 = EMULATION | | | 0 = NATIVE | | |
|---|---|---|---|---|---|
| 00FFFE,F | —IRQ BRK | Hardware | 00FFEE,F | —IRQ | Hardware |
| 00FFFC,D | —RESET | Hardware | 00FFEC,D | —RESET | Hardware |
| 00FFFA,B | —NMI | Hardware | 00FFEA,B | —NMI | Hardware |
| 00FFF8,9 | —ABORT | Hardware | 00FFE8,9 | —ABORT | Hardware |
| 00FFF6,7 | — — | — | 00FFE6,7 | —BRK | Software |
| 00FFF4,5 | —COP | Software | 00FFE4,5 | —COP | Software |

The VP output is low during the 2 cycles the vector locations are accessed. As a result of executing an interrupt D = 0 and I = 1 in the status register P.

Emulation (E), Memory (M) and Index X

The E, M and X status bits in the status register (P) are metal mask selectable outputs. These bits may be thought of as op-code extensions and therefore may be used for memory and system management.

Vector Pull (VP)

The vector pull (VP) output goes low during the two cycles when a vector address is being pulled (i.e., 00FFFE,F for IRQ). This output goes low for all interrupt vector pulls: ABORT, BRK, COP, IRQ, NMI, and RES. This output may be used to modify-prioritize interrupt routines.

Valid Data Address (VDA) and Valid Program Address (VPA)

The valid data address (VDA) output and valid program address (VPA) output indicates the type of memory addressed by the address bus. The following table applies.

| VDA | VPA | |
|---|---|---|
| 0 | 0 | —Internal operation—address and data bus available |
| 0 | 1 | —Valid program address—may be used for program cache control |
| 1 | 0 | —Valid data address—may be used for data cache control |
| 1 | 1 | —Op Code fetch—may be used for program cache control |

The VDA and VPA may be used for virtual and cache memory control. A metal option may select the 6502 emulation mode (E = 1). The VPA output goes high only during an op code fetch, and functions as the sync output which signifies an op code is being fetched from memory.

Addressing Modes

Twenty-four addressing modes are available to the user of the W65SC816 family of microprocessors. The addressing modes are described in the following paragraphs.

1. Immediate Addressing [imm]

With immediate addressing the operand is contained in the second byte (second and third byte for 16 bit data) of the instruction.

2, 3. Absolute and Absolute Long Addressing [a], [al]

For absolute addressing the second byte of the instruction specifies the eight low order bits of the effective address while the third byte specifies the eight high order bits. For absolute long addressing the fourth byte specifies the bank address. The full 16.7 megabyte address space is addressed in the long mode. In the short mode the bank address is specified by the data bank register.

4. Direct Addressing [d]

Direct addressing allows for shorter code and execution times by only fetching a second byte of instruction. The second byte is added to the direct register (D) value. When the direct register low (DL) is zero fastest execution occurs. The bank address is always zero.

5. Accumulator Addressing [acc]

This form of addressing is represented with a one byte instruction and performs an operation on the accumulator(s).

6. Implied Addressing [imp]

In the implied addressing mode the address of the operand is implicitly stated in the operation code of the instruction.

7, 8. Direct Indirect Indexed and Direct Indirect Indexed Long Addressing [(d), y], [(dl), y]

This form of addressing is usually referred to as Indirect Y. The second byte of the instruction is added to the direct register and points to a memory location in bank zero. The contents of this memory location and the byte following (the next byte is the bank address for the long mode) are added to the Y index register with the result being the effective address. For the short mode the bank address is specified by the da... ank register. Note that when DL equals zero execution is fastest.

9. Direct Indexed Indirect Addressing [(d,x)]

With direct indexed indirect addressing (usually referred to as Indirect, X) the second byte of the instruction is added to the contents of the direct register and then adding the X register value. The result of these additions points to a memory location on bank zero whose contents is the low order byte of the effective address with the byte following the high byte of the effective address. The bank address of the effective address is specified by the data bank register.

10, 11. Direct Indexed with X and Direct Indexed with Y Addressing [d,x], [d,y]

Direct indexed with X usually referred to as Direct, X and direct indexed with Y usually referred to as Direct, Y are two byte instructions. The second byte is added to the direct register (D) and this result is added to the appropriate index register. The bank address is always zero. Execution is fastest when the low byte of the direct register (DL) is zero.

12, 13, 14. Absolute Indexed with X, Absolute Indexed Long with X, and Absolute Indexed with Y Addressing [a,x], [al,x], [a,y]

Absolute indexed addressing is used in conjunction with the X and Y index registers and is referred to as Absolute, X Absolute Long, X and Absolute, Y. The effective address is formed by adding the contents of the X or Y register to the second and third bytes of the instructions. The bank address is specified by the data bank register except in the long mode the fourth byte specifies the bank address.

15, 16. Program Counter Relative and Program Counter Relative Long Addressing [r], [rl]

Program counter relative addressing, usually referred to as relative and relative long addressing is used only with the branch instructions. The second byte is added to the program counter which for relative creates a -128 or -127 byte offset. The second and third bytes are added to the program counter to create -32768 or -32767 byte offset for the branch always long operation.

17. Absolute Indirect Addressing (Jump Instruction Only) [(a)]

The second and third bytes of the instruction contains the low and high order address bytes of a memory location located in bank zero. This memory location and the byte following contain the effective address which is loaded into the program counter. The destination bank address is specified by the program bank register except for the JML instruction the third byte fetched is the destination bank address.

18, 19. Direct Indirect and Direct Indirect Long Addressing [(d)], [(dl)]

In this form of addressing the second byte of the instruction is added to the direct register and the result points to a memory location in bank zero. The contents of this location and the following location (the next location is the bank address for the long mode) is the effective address. The bank address is specified by the data bank register for the direct indirect mode.

20. Absolute Indexed Indirect Addressing (Jump and Jump to Subroutine) [(a,x)]

With absolute indexed indirect addressing the second and third bytes of the instruction are added to the X index register contents. The result points to the low and (byte following) high order bytes which are loaded into the program counter. The bank address is specified by the program bank register.

21. Stack Addressing [s]

This addressing mode uses the stack register to address memory locations. The instructions which use the stack addressing include push, pull, interrupts, jump to subroutine, return from interrupt and return from subroutine. The bank address is always zero. Vectors are always pulled from bank 00. (See Compatibility Issues for 6502 Emulation)

22. Stack Relative Addressing [sr]

With stack relative addressing the second byte of the instruction is added to the stack register value. This effective address points to a data memory location on the stack. For 16 bit data the next location on the stack is the high byte of data. This addressing mode, in conjunction with using the push instructions, may be used to pass data to subroutines using the stack. The new TSC and TCS instructions provide fast stack modification. The direct register can be used for user stack functions. The bank register is always zero.

23. Stack Relative Indirect Indexed Add:  ;[(sr),y]
With stack relative indirect indexed with Y, second byte of the instruction is added to the stack register value. The address formed by this addition points to the low byte (the next location contains the high byte) of an indirect address. The Y register is added to this address to form the effective data address. This addressing mode, in conjunction with using the push effective address (PEA, PEI, PER) instructions, may be used to pass data addresses to subroutines using the stack. The new TSC and TCS instructions provide fast stack register modification. The direct register can be used for user stack functions. The data bank register is the bank address for the effective address.

24. Block Move Addressing [xyc]
This addressing mode is used for multiple byte moves forward (MVP) or backward (MVN). These three byte instructions use the X register for the source address, the Y register for the destination address and the C accumulator contains the number of bytes to be moved. The destination bank address is the second byte of the instruction with the source bank specified by the third byte. The data bank register is loaded with the destination bank value (second byte of the instruction).

Table 2. Instruction Set
W65SC816 Instructions (256 OP Codes)

A. The Original 6502 Instruction Set (151 Op Codes)
1. ADC — Add Memory to Accumulator with Carry
2. AND — "AND" Memory with Accumulator
3. ASL — Shift Left One Bit (Memory or Accumulator)
4. BCC — Branch on Carry Clear
5. BCS — Branch on Carry Set
6. BEQ — Branch on Result Zero
7. BIT — Test Bits in Memory with Accumulator
8. BMI — Branch on Result Minus
9. BNE — Branch on Result Not Zero
10. BPL — Branch on Result Plus
11. BRK — Force Break
12. BVC — Branch on Overflow Clear
13. BVS — Branch on Overflow Set
14. CLC — Clear Carry Flag
15. CLD — Clear Decimal Mode
16. CLI — Clear Interrupt Disable Bit
17. CLV — Clear Overflow Flag
18. CMP — Compare Memory and Accumulator
19. CPX — Compare Memory and Index X
20. CPY — Compare Memory and Index Y
21. DEC — Decrement Memory by One
22. DEX — Decrement Index X by One
23. DEY — Decrement Index Y by One
24. EOR — "Exclusive-or" Memory with Accumulator
25. INC — Increment Memory by One
26. INX — Increment Index X by One
27. INY — Increment Index Y by One
28. JMP — Jump to New Location
29. JSR — Jump to New Location Saving Return Address
30. LDA — Load Accumulator with Memory
31. LDX — Load Index X with Memory
32. LDY — Load Index Y with Memory
33. LSR — Shift One Bit Right (Memory or Accumulator)
34. NOP — No Operation
35. ORA — "OR" Memory with Accumulator
36. PHA — Push Accumulator on Stack
37. PHP — Push Processor Status on Stack
38. PLA — Pull Accumulator from Stack
39. PLP — Pull Processor Status from Stack
40. ROL — Rotate One Bit Left (Memory or Accumulator)
41. ROR — Rotate One Bit Right (Memory or Accumulator)
42. RTI — Return from Interrupt
43. RTS — Return from Subroutine
44. SBC — Subtract Memory from Accumulator with Borrow
45. SEC — Set Carry Flag
46. SED — Set Decimal Mode
47. SEI — Set Interrupt Disable Status
48. STA — Store Accumulator in Memory
49. STX — Store Index X in Memory
50. STY — Store Index Y in Memory
51. TAX — Transfer Accumulator to Index X
52. TAY — Transfer Accumulator to Index Y
53. TSX — Transfer Stack Pointer to Index X
54. TXA — Transfer Index X to Accumulator
55. TXS — Transfer Index X to Stack Register
56. TYA — Transfer Index Y to Accumulator

B. New W65SCXXX Instructions (13 Op Codes)
1. BRA — Branch Relative always
2. PLX — Pull X from Stack
3. PLY — Pull Y from Stack
4. PHX — Push X on Stack
5. PHY — Push Y on Stack
6. STZ — Store Zero in Memory (Direct; Direct, X; Abs; Abs, X)
7. TRB — Test and Reset Memory Bits Determined by Accumulator A (Direct and Absolute)
8. TSB — Test and Set Memory Bits Determined by Accumulator A (Direct and Absolute)

C. New W65SCXXX Addressing Modes (14 Op Codes)
2. BIT — Test Bits in Memory with Accumulator (Direct, X; Absolute, X; Immediate)
2. DEC — Decrement (Accumulator)
3. Group I — Instructions (Direct Indirect (8 Op Codes))
4. INC — Increment (Accumulator)
5. JMP — Jump to New Location (Absolute Indexed Indirect)

D. Group I Instructions with New Addressing Modes (48 Op Codes)
- Direct Indirect Long Indexed with Y (8 Op Codes)
- Direct Indirect Long (8 Op Codes)
- Absolute Long and Absolute Long Indexed with X (16 Op Codes)
- Stack Relative (8 Op Codes)
- Stack Relative Indirect Indexed Y (8 Op Codes)

1. ADC — Add Memory to Accumulator with Carry
2. AND — "AND" Memory with Accumulator
3. CMP — Compare Memory and Accumulator
4. EOR — "Exclusive-or" Memory with Accumulator
5. LDA — Load Accumulator with Memory
6. ORA — "Or" Memory with Accumulator
7. SBC — Subtract Memory from Accumulator with Borrow
8. STA — Store Accumulator in Memory

E. New Push and Pull Instructions (7 Op Codes)
1. PEA — Push Effective Absolute Address or Immediate Data Word on Stack
2. PEI — Push Effective Indirect Address or Direct Data Word on Stack
3. PER — Push Effective Program Counter Relative Indirect Address or Program Counter Relative Data Word on Stack
4. PLB — Pull Data Bank Register from Stack
5. PLD — Pull Direct Register from Stack
6. PHB — Push Data Bank Register on Stack
7. PHD — Push Direct Register on Stack
8. PHK — Push Program Bank Register on stack

F. Status Register Instructions (2 Op Codes)
1. REP — Reset Status Bits Defined by Immediate Byte 1 = Reset
   0 = Do not change
2. SEP — Set Status Bits Defined by Immediate Byte 1 = Set
   0 = Do not change

G. New Register Transfer Instructions (8 Op Codes)
1. TCD — Transfer C Accumulator to Direct Register D
2. TDC — Transfer Direct Register D to C Accumulator
3. TCS — Transfer C Accumulator to Stack Register
4. TSC — Transfer Stack Register to Accumulator C
5. TXY — Transfer X to Y
6. TYX — Transfer Y to X
7. XBA — Exchange B and A
8. SCE — Exchange Carry Bit C with Emulation Bit E.

H. New Branch, Jump and Return Instructions (6 Op Codes)
1. BRL — Branch Relative Long Always (16 Bit Relative—32768 to +32767) (Addressing Mode)
2. JML — Jump Indirect Long
3. JMP — Jump Absolute Long
4. JSL — Jump to Subroutine Long (Uses RTL for Return)
5. JSR — Jump to Subroutine (Indexed Indirect)
6. RTL — Return from Subroutine Long

I. New Block Move Instructions (2 Op Codes)
1. MVN — Move Block from Source (X Addressed) to Destination (Y Addressed). Block Length Defined by C. X, Y are Incremented.
2. MVP — Move Block from Source (X Addressed) to Destination (Y Addressed). Block Length Defined by C. X, Y are Decremented.

J. New Co-Processor Operations (1 Op Code)
1. COP — Co-Processor Instruction with Associated COP Vector and ABORT Input Supports Co-Processing Function i.e., Floating Point Processors, etc.

K. New System Control Instructions (3 Op Codes)
1. STP — Stop-the-clock Instruction Stops the Oscillator Input (or 02 Input) During 02 = 1. This Mode Is Released When RES Goes to a Zero. System Initialization May Be Desired: However, if After RESET One Performed an RTI, Program Execution Begins With the Instruction Following the STP Op Code in Program Sequence.
2. WAI — Wait for Interrupt Pulls RDY Low and Is Cleared by IRQ or NMI Active Input.
3. WDM — There is One Reserved Op Code Defined as WDM Which Will Be Used For Future Systems. The W65SC816 Performs a No-Operation

Table 3. Addressing Mode Summary

| Address Mode | Instruction Times In Memory Cycles | | Memory Utilization In Number of Program Sequence Bytes | |
|---|---|---|---|---|
| | Original 8 Bit NMOS 6502 | New W65SC816 | Original 8 Bit NMOS 6502 | New W65SC816 |
| 1. Immediate | 2 | 2(3) | 2 | 2(3) |
| 2. Absolute | 4(5) | 4(3,5) | 3 | 3 |
| 3. Absolute Long | — | 5(3) | — | 4 |
| 4. Direct | 3(5) | 3(3,4,5) | 2 | 2 |
| 5. Accumulator | 2 | 2 | 1 | 1 |
| 6. Implied | 2 | 2 | 1 | 1 |
| 7. Direct Indirect Indexed (IND), Y | 5(1) | 5(1,3,4) | 2 | 2 |
| 8. Direct Indirect Indexed Long (IND), Y Long | — | 6(3,4) | — | 2 |
| 9. Direct Indexed Indirect (IND, X) | 6 | 6(3,4) | 2 | 2 |
| 10. Direct, X | 4(5) | 4(3,4,5) | 2 | 2 |
| 11. Direct, Y | 4 | 4(3,4) | 2 | 2 |
| 12. Absolute, X | 4(1,5) | 4(1,3,5) | 3 | 3 |
| 13. Absolute Long, X | — | 5(3) | — | 4 |
| 14. Absolute, Y | 4(1) | 4(1,3) | 3 | 3 |
| 15. Relative | 2(1,2) | 2(2) | 2 | 2 |
| 16. Relative Long | — | 3(2) | — | 3 |
| 17. Absolute Indirect (Jump) | 5 | 5 | 3 | 3 |
| 18. Direct Indirect | — | 5(3,4) | — | 2 |
| 19. Direct Indirect Long | — | 6(3,4) | — | 2 |
| 20. Absolute Indexed Indirect (Jump) | — | 6 | — | 3 |
| 21. Stack | 3-7 | 3-8 | 1-3 | 1-4 |
| 22. Stack Relative | — | 4(3) | — | 2 |
| 23. Stack Relative Indirect Indexed | — | 7(3) | — | 2 |
| 24. Block Move X, Y, C (Source, Destination, Block Length) | — | 7 | — | 3 |

NOTES:
1. Page boundary, add 1 cycle if page boundary is crossed when forming address.
2. Branch taken, add 1 cycle if branch is taken.
3. M = 0 or X = 0, 16 bit operation, add 1 cycle, add 1 byte for immediate.
4. Direct register low (DL) not equal zero, add 1 cycle.
5. Read-Modify-Write, add 2 cycles for M = 1, add 3 cycles for M = 0.

Packaging Information

Ceramic Package

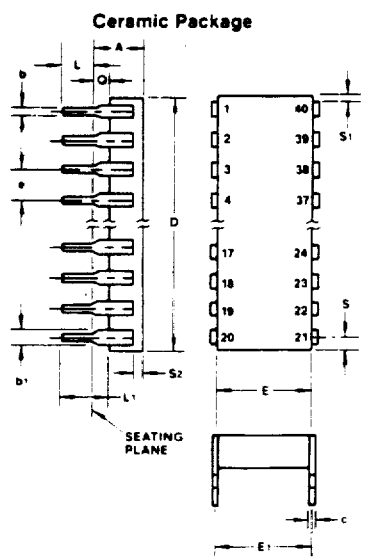

Plastic & Cerdip Package

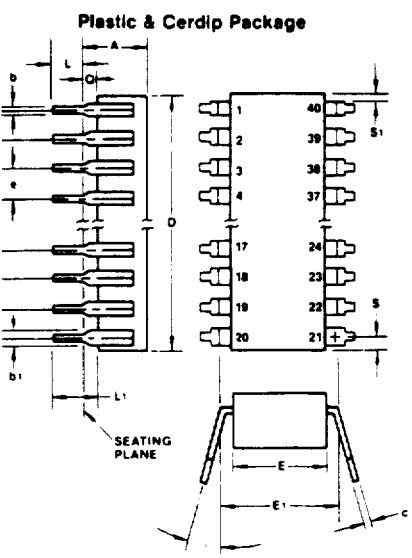

| SYM- | 40-PIN PACKAGE | | | |
|---|---|---|---|---|
| | INCHES | | MILLIMETERS | |
| BOL | MIN | MAX | MIN | MAX |
| A | — | 0.225 | — | 5.72 |
| b | 0.014 | 0.023 | 0.36 | 0.56 |
| b1 | 0.030 | 0.070 | 0.76 | 1.78 |
| c | 0.008 | 0.015 | 0.20 | 0.38 |
| D | — | 2.096 | — | 53.24 |
| E | 0.510 | 0.620 | 12.95 | 15.75 |
| E1 | 0.520 | 0.630 | 13.21 | 16.00 |
| e | 0.100 BSC | | 2.54 BSC | |
| L | 0.125 | 0.200 | 3.18 | 5.08 |
| L1 | 0.150 | — | 3.81 | — |
| Q | 0.020 | 0.060 | 0.51 | 1.52 |
| S | — | 0.098 | — | 2.49 |
| S1 | 0.005 | — | 0.13 | — |
| S2 | 0.005 | — | 0.13 | — |
| α | 0° | 15° | 0° | 15° |

```
W 65SC816 P I -2
```

Description
C — Special
W — Standard
Product Identification Number
Package
P — Plastic    E — Leadless Chip Carrier
C — Ceramic   X — Dice
D — Cerdip
Temperature/Processing
I — -40°C to +85°C
Performance Designator
Designators selected for speed and power specifications
-1  1 MHz    -3  3 MHz
-2  2 MHz    -4  4 MHz

Sales Offices:

Technical or sales assistance may be requested from

The Western Design Center, Inc
2166 East Brown Road
Mesa, Arizona 85203
602 962-4545
TWX 6835057

WARNING:
MOS CIRCUITS ARE SUBJECT TO DAMAGE FROM STATIC DISCHARGE

Internal static discharge circuits are provided to minimize part damage due to environmental static electrical charge build ups. Industry established recommendations for handling MOS circuits include:
1. Ship and store product in conductive shipping tubes or in conductive foam plastic. Never ship or store product in non-conductive plastic containers or non-conductive plastic foam material.
2. Handle MOS parts only at conductive work stations
3. Ground all assembly and repair tools

Represented in your area by:

WDC reserves the right to make changes at any time without notice in order to improve design and supply the best possible product.

Information contained herein is provided gratuitously and without liability to any user. Reasonable efforts have been made to verify the accuracy of the information but no guarantee whatsoever is given as to the accuracy or as to its applicability to particular uses. In every instance it must be the responsibility of the user to determine the suitability of the products for each application. WDC products are not authorized for use as critical components in life support devices or systems. Nothing contained herein shall be construed as a recommendation to use any product in violation of existing patents or other rights of third parties. The sale of any WDC product is subject to all WDC Terms and Conditions of Sale and Sales Policies, copies of which are available upon request.

The Western Design Center, Inc.    2166 E. Brown Rd./Mesa, AZ 85203    (602) 962-4545 / TWX 6835057

Original                                                                              Published in U.S.A.  November 1983

I claim:

1. An integrated circuit CMOS microprocessor chip having a surface with first, second, third, and fourth edges which sequentially circumscribe said CMOS microprocess chip, said second edge being defined as the bottom of said surface, said CMOS microprocessor chip comprising in combination:

(a) data bus means on said surface for transferring digital data;

(b) address bus means on said surface for transferring digital address information;

(c) register circuit means on said surface coupled to said data bus means and said address bus means for storing digital information received from said data bus means and said address bus means in accordance with execution of program instructions by said CMOS microprocessor chip;

(d) address output buffer circuit means on said surface coupled to said address bus means for temporarily storing digital address information from said address bus means, said address output buffer circuit means being located along said first and second edges between said register circuit means and said first and second edges;

(e) instruction decoding circuit means located above said register circuit means for decoding instructions to be executed by said CMOS microprocessor chip, said instruction decoding circuit means including i. first read-only memory decoding means including N-channel MOSFETs arranged in an array for producing a plurality of minterm signals in response to instruction information in an instruction register on said surface, that array including a plurality of groups each including a plurality of series connected N-channel MOSFETs producing a respective minterm signal, ii. a plurality of CMOS minterm inverters each having an input receiving a respective one of said minterm signals and each producing an inverted minterm output signal, iii. second read-only memory decoding means including N-channel MOSFETs arranged in an array for producing a plurality of sum-of-minterm signals in response to said inverted minterm output signals, that array including a plurality of groups each including a plurality of parallel connected N-channel MOSFETs producing a respective sum-of-minterm signal, wherein said minterm inverters are disposed between said first and second read-only memory decoding means, and iv. register transfer circuit means responsive to said sum-of-minterm signals for transferring digital address information between said register circuit means and said address bus means and for transferring digital data between said register circuit means and said data bus means in accordance with the execution of program instructions, said register transfer circuit means being disposed adjacent to and above said register circuit means, said second read-only memory decoding means being disposed adjacent to and above said register transfer circuit means, and said first read-only memory circuit means being disposed above said second read-only memory circuit means, said data bus means and said address bus means extending horizontally through said register circuit means.

2. The integrated circuit CMOS microprocessor chip of claim 1 wherein said N-channel MOSFETs are silicon gate MOSFETs, said N-channel MOSFETs in said first read-only memory decoding means being arranged as vertical groups of N-channel MOSFETs coupled in series, said inverted minterm output signals being conducted at the bottom of said first read-only memory decoding means by a plurality of vertical polycrystalline silicon conductors, respectively, which form gate electrodes of various ones of said N-channel MOSFETs in said second read-only memory decoding means, said N-channel MOSFETs of said second read-only decoding means being arranged as horizontal groups of N-channel MOSFETs, the N-channel MOSFETs of each horizontal group, respectively, having a separate common drain electrode connection which produces a corresponding one of said sum-of-minterm signals.

3. The integrated CMOS microprocessor chip of claim 2 wherein in said first read-only memory decoding means, said vertical groups of series-coupled MOSFETs are arranged as a plurality of parallel, closely spaced pairs of vertical groups each of which are spaced from another of said pairs by a distance large enough to allow placement of a metal-to-polycrystalline silicon contact area therebetween, gate electrodes of said N-channel MOSFETs of said first read-only memory decoding means being formed of layers of polycrystalline silicon each including such a metal-to-polycrystalline silicon contact area, said first read-only memory decoding means including a plurality of horizontal metal lines conducting op code signals and complements thereof from said instruction register and each making contact to predetermined ones of said layers of polycrystalline silicon.

4. The integrated circuit CMOS microprocessor chip of claim 3 wherein each of said common drain electrode connections includes a plurality of horizontal metal conductors each connected to the drain electrodes of N-channel MOSFETs of a respective one of said horizontal groups.

5. The integrated circuit CMOS microprocessor chip of claim 4 wherein in said second read-only memory decoding means, the ones of said horizontal sum-of-minterm conducting metal conductors having the fewest number of said N-channel MOSFET drain electrodes connected thereto are located in the lower portion of said second read-only memory decoding means and wherein the ones of said horizontal sum of minterm conducting metal conductors having the most of said N-channel MOSFET drain electrodes connected thereto are located in the upper portion of said second read-only memory decoding means.

6. The integrated circuit CMOS microprocessor chip of claim 5 whefein non-metallic crossunders conduct sum-of-minterm signals from various ones of said horizontal sum-of-minterm metal conductors in the lower portion of said second read-only memory decoding means directly downward into said register transfer circuit means.

7. The integrated circuit CMOS microprocessor chip of claim 5 including means for conducting sum-of-minterm signals from various ones of said horizontal sum-of-minterm metal conductors in the upper section of said second read-only memory decoding means around the right end of said second read-only memory decoding means, to the left under said second read-only memory decoding means and directly downward into said register transfer circuit means.

8. The integrated circuit CMOS microprocessor chip of claim 1 wherein said data bus means is $2^N$ bits wide and said register circuit means includes a plurality of $2^N$ bit wide registers, said chip including status register circuit means disposed in said register circuit means and coupled directly to said data bus means and said register transfer means for storing status information written therein in accordance with execution of instructions by said CMOS microprocessor chip, said status register circuit means including an emulation bit and means responsive to said emulation bit for causing said microprocessor chip to emulate a different microprocessor that has a data bus which is one-half as wide as said data bus means and a plurality of registers that correspond, respectively, to said plurality of said $2^N$ bit wide registers but are only $2^{(N-1)}$ bits wide, N being an integer.

9. The integrated circuit CMOS microprocessor chip of claim 5 including abort circuit means responsive to an abort input signal for preventing modification of information in certain registers of said register circuit means during an abort condition, said abort circuit means including abort input circuitry receiving said abort input signal and located along said fourth edge and including an abort conductor routed along the left side of said instruction decoding circuit means and into portions of said register transfer circuit means containing to said certain registers.

10. The integrated circuit CMOS microprocessor chip of claim 9 including valid program address means located above said address output buffer means along said first edge for producing a valid program address output signal, and also including, from left to right along said fourth edge, non-maskable interrupt (NMI) circuitry, IRQ interrupt circuitry, said abort circuit means, ready signal circuitry, vector pull circuitry, reset interrupt circuitry, valid data address means for producing a valid data address output signal, status output circuitry, oscillator and clock generator circuitry, bus enable circuitry, and emulation bit output circuitry.

11. The integrated circuit CMOS microprocessor chip of claim 10 including a plurality of bonding pads peripherally located along the edges of said chip and coupled to various circuitry therein and arranged in a counter-clockwise sequence as follows (VP)*, RDY, (ABORT)*, (IRQ)*, (ML)*, (NMI)*, VPA, VDD, A0, A1, A2, A3, A4, A5, A6, A7, A8, A9, A10, A11, VSS, A12, A13, A14, A15, D7/BA7, D6/BA5, D5/BA5, D4/BA4, D3/BA4, D2/BA2, D1/BA1, D0/BA0, R/(W)*, E, BE, $\phi$2, M/X, VDA, and (RES)*.

12. In a integrated circuit CMOS microprocessor, instruction decoding circuit means located above a plurality of register circuits for decoding instructions, said instruction decoding circuit means including:

(a) first read-only memory decoding means including N-channel MOSFETs arranged in an array for producing a plurality of minterm signals in response to instruction information in an instruction register on said surface, that array including a plurality of groups each including a plurality of series connected N-channel MOSFETs producing a respective minterm signal, (b) a plurality of minterm inverters each having an input receiving a respective one of said minterm signals and each producing an inverted minterm output signal, (c) second read-only memory decoding means including N-channel MOSFETs arranged in an array for producing a plurality of sum-of-minterm signals in response to said inverted minterm output signals, that array including a plurality of groups each including a plurality of parallel connected N-channel MOSFETs producing a respective sum-of-minterm signal, wherein said N-channel MOSFETs are silicon gate MOSFETs, said N-channel MOSFETs in said first read-only memory decoding means being arranged as vertical groups of N-channel MOSFETs coupled in series, said inverted minterm output signals being conducted at the bottom of said first read-only memory decoding means by a plurality of vertical polycrystalline silicon conductors, respectively, which form gate electrodes of various ones of said N-channel MOSFETs in said second read-only memory decoding means, said N-channel MOSFETs of said second read-only decoding means being arranged as horizontal groups of N-channel MOSFETs, the N-channel MOSFETs of each horizontal groups, respectively, having a separate common drain electrode connection which produces a corresponding one of said sum-of-minterm signals, the ones of said horizontal sum-of-minterm conducting metal conductors having the fewest number of said N-channel MOSFET drain electrodes connected thereto are located in the lower portion of said second read-only memory decoding means and wherein the ones of said horizontal sum of minterm conducting metal conductors having the most of said N-channel MOSFET drain electrodes connected thereto are located in the upper portion of said second read-only memory decoding means;

(d) register transfer circuit means responsive to said sum-of-minterm signals for transferring digital address information between said register circuit means and said address bus means and for transferring digital data between said register circuit means and said data bus means in accordance with the execution of program instructions, said register transfer circuit means being disposed adjacent to and above said register circuit mwans, said second read-only memory decoding means being disposed adjacent to and above said register transfer circuit means, and said first read-only memory circuit means being disposed above said second read-only memory circuit means, said data bus means and said address bus means extending horizontally through said register circuit means.

13. An integrated circuit CMOS microprocessor chip having a surface with first, second, third, and fourth edges which sequentially circumscribe said CMOS microprocessor chip, said second edge being defined as the bottom of said surface, said CMOS microprocess chip comprising in combination:

(a) data bus means on said surface for transferring digital data;

(b) address bus means on said surface for transferring digital address information;

(c) register circuit means on said surface coupled to said data bus means and said address bus means for storing digital information received from said data bus means and said address bus means in accordance with execution of program instructions by said CMOS microprocessor chip;

(d) address output buffer circuit means on said surface coupled to said address bus means for temporarily storing digital address information from said address bus means, said address output buffer circuit means being located along said first and second edges between said register circuit means and said first and second edges;

(e) instruction decoding circuit means located above said register circuit means for decoding instructions to be executed by said CMOS microprocessor chip, said instruction decoding circuit means including
  i. first read-only memory decoding means including N-channel MOSFETs arranged in an array for producing a plurality of minterm signals in response to instruction information in an instruction register on said surface, that array including a plurality of groups each including a plurality of series connected N-channel MOSFETs producing a respective minterm signal,
  ii. a plurality of CMOS minterm inverters each having an input receiving a respective one of said minterm signals and each producing an inverted minterm output signal,
  iii. second read-only memory decoding means including N-channel MOSFETs arranged in an array for producing a plurality of sum-of-minterm signals in response to said inverted minterm output signals, that array including a plurality of groups each including a plurality of parallel connected N-channel MOSFETs producing a respective sum-of-minterm signal, and
  iv. register tranfer circuit means responsive to said sum-of-minterm signals for transferring digital address information between said register circuit means and said address bus means and for transferring digital data between said register circuit means and said data bus means in accordance with the execution of program instructions, said register transfer circuit means being disposed adjacent to and above said register circuit means, said second read-only memory decoding means being disposed adjacent to and above said register transfer circuit means, and said first read-only memory circuit means being disposed above said second read-only memory circuit means, said data bus means and said address bus means extending horizontally through said register circuit means, wherein said data bus means is $2^N$ bits wide and said register circuit means includes a plurality of $2^N$ bit wide registers, said chip including status register circuit means disposed in said register circuit means and coupled directly to said data bus means and said register transfer means for storing status information written therein in accordance with execution of instructions by said CMOS microprocessor chip, said status register circuit means including an emulation bit and means responsive to said emulation bit for causing said microprocessor chip to emulate a different microprocessor that has a data bus which is one-half as wide as said data bus means and a plurality of registers that correspond, respectively, to said plurality of said $2^N$ bit wide registers but are only $2^{(N-1)}$ bits wide, N being an integer.

* * * * *